United States Patent
Chai

(10) Patent No.: US 10,560,327 B2
(45) Date of Patent: Feb. 11, 2020

(54) CELL MEASUREMENT METHOD, CELL RESOURCE SHARING METHOD, AND RELATED DEVICE

(71) Applicant: HUAWEI TECHNOLOGIES CO., LTD., Shenzhen, Guangdong (CN)

(72) Inventor: Li Chai, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/140,149

(22) Filed: Sep. 24, 2018

(65) Prior Publication Data
US 2019/0028348 A1 Jan. 24, 2019

Related U.S. Application Data

(63) Continuation of application No. 14/143,909, filed on Dec. 30, 2013, now Pat. No. 10,084,651, which is a (Continued)

(30) Foreign Application Priority Data

Jul. 12, 2011 (CN) .......................... 2011 1 0194605

(51) Int. Cl.
*H04L 12/24* (2006.01)
*H04L 1/00* (2006.01)
(Continued)

(52) U.S. Cl.
CPC ........ *H04L 41/0853* (2013.01); *H04L 1/0026* (2013.01); *H04L 1/0077* (2013.01);
(Continued)

(58) Field of Classification Search
CPC . H04L 41/0853; H04L 1/0026; H04L 5/0077; H04L 5/0035; H04L 5/005;
(Continued)

(56) References Cited

U.S. PATENT DOCUMENTS

2009/0316652 A1 12/2009 Agashe et al.
2012/0135771 A1 5/2012 Futaki et al.
(Continued)

FOREIGN PATENT DOCUMENTS

CN 101635950 A 1/2010
CN 101932080 A 12/2010
(Continued)

OTHER PUBLICATIONS

3GPP TS 36.331 V10.2.0 (Year: 2011).*
(Continued)

*Primary Examiner* — Ricky Q Ngo
*Assistant Examiner* — Stephen N Steiner
(74) *Attorney, Agent, or Firm* — James Anderson Harrison

(57) ABSTRACT

Disclosed are a cell measurement method, a cell resource sharing method, and a related device. The cell measurement method includes: a user equipment receives a measurement configuration message sent by a base station, wherein the measurement configuration message comprises at least one physical cell identity and CSI-RS configuration information corresponding to a measured cell, and wherein the physical cell identity is used to indicate the measured cell; measuring the CSI-RS corresponding to the measured cell according to the CSI-RS configuration information, and obtaining a measurement result of the measuring; sending the obtained measurement result of the measured cell and measurement object information of the measured cell to the base station via a measurement report. The technical solution provided by the present disclosure can effectively improve the accuracy of the measurement result, and enable the base station to distinguish different measurement results corresponding to different cells.

10 Claims, 7 Drawing Sheets

Related U.S. Application Data continuation of application No. PCT/CN2012/078570, filed on Jul. 12, 2012.

(51) Int. Cl.
*H04L 5/00* (2006.01)
*H04W 24/10* (2009.01)
*H04L 25/02* (2006.01)
*H04W 36/00* (2009.01)
*H04B 7/024* (2017.01)
*H04B 7/06* (2006.01)

(52) U.S. Cl.
CPC ............ *H04L 5/005* (2013.01); *H04L 5/0035* (2013.01); *H04L 5/0091* (2013.01); *H04W 24/10* (2013.01); *H04B 7/024* (2013.01); *H04B 7/0626* (2013.01); *H04L 5/0048* (2013.01); *H04L 25/0226* (2013.01); *H04W 36/0083* (2013.01)

(58) Field of Classification Search
CPC .. H04L 5/0091; H04W 24/10; H04W 72/046; H04W 72/085; H04W 72/087; H04W 72/1231
See application file for complete search history.

(56) References Cited

U.S. PATENT DOCUMENTS

| | | | |
|---|---|---|---|
| 2012/0257515 A1* | 10/2012 | Hugl | H04W 24/10 370/252 |
| 2012/0281544 A1 | 11/2012 | Anepu et al. | |
| 2013/0003788 A1 | 1/2013 | Marinier et al. | |
| 2014/0031007 A1 | 1/2014 | Gao et al. | |

FOREIGN PATENT DOCUMENTS

| | | |
|---|---|---|
| CN | 102067666 A | 5/2011 |
| CN | 102257846 A | 11/2011 |
| EP | 2381715 A1 | 10/2011 |
| WO | 2010078681 A1 | 7/2010 |
| WO | 2011013990 A2 | 2/2011 |
| WO | 2011016560 A1 | 2/2011 |
| WO | 2011056607 A1 | 5/2011 |

OTHER PUBLICATIONS

3GPP TS 36331 V10.2.0 (Jun. 2011), 3rd Generation Partnership Project;Technical Specification Group Radio Access Network;Evolved Universal Terrestrial Radio Access (E-UTRA);Radio Resource Control (RRC);Protocol specification (Release 10), total 294 pages.

3GPP TS 36A23 V10.2.0 (Jun. 2011), 3rd Generation Partnership Project;Technical Specification Group Radio Access Network;Evolved Universal Terrestrial Radio Access Network (E-UTRAN);X2 application protocol (X2AP)(Release 10), total 130 pages.

R1-110461,Ericsson, ST-Ericsson, "Baseline Scheme and Focus of CoMP studies",3GPP TSG-RAN WG1 #63bis, Dublin, Ireland, Jan. 17-Jan. 21, 2011.total 2 pages.

R1-110649,Ericsson, ST-Ericsson, "Aspects on Distributed RRUs with Shared Cell-ID for Heterogeneous Deployments", 3GPP TSG-RAN WG1 #64,Taipei, Taiwan, Feb. 21-Feb. 25, 2011.total 11 pages.

R1-110573, ZTE,"Views on Rel-11 CoMP",3GPP TSG RAN WG1 Meeting #63bis,Jan. 2011.total 2 pages.

3GPP TS 36300 V10.4.0 (Jun. 2011),3rd Generation Partnership Project;Technical Specification Group Radio Access Network;Evolved Universal Terrestrial Radio Access (E-UTRA) and Evolved Universal Terrestrial Radio Access getwork (E-UTRAN);Overall description;Stage 2(Release 10),total 194 pages.

3GPP TS 36.213 V10.2.0 (Jun. 2011),3rd Generation Partnership Project;Technical Specification Group Radio Access Network;Evolved Universal Terrestrial Radio Access (E-UTRA);Physical layer procedures(Release 10),total 120 pages.

* cited by examiner

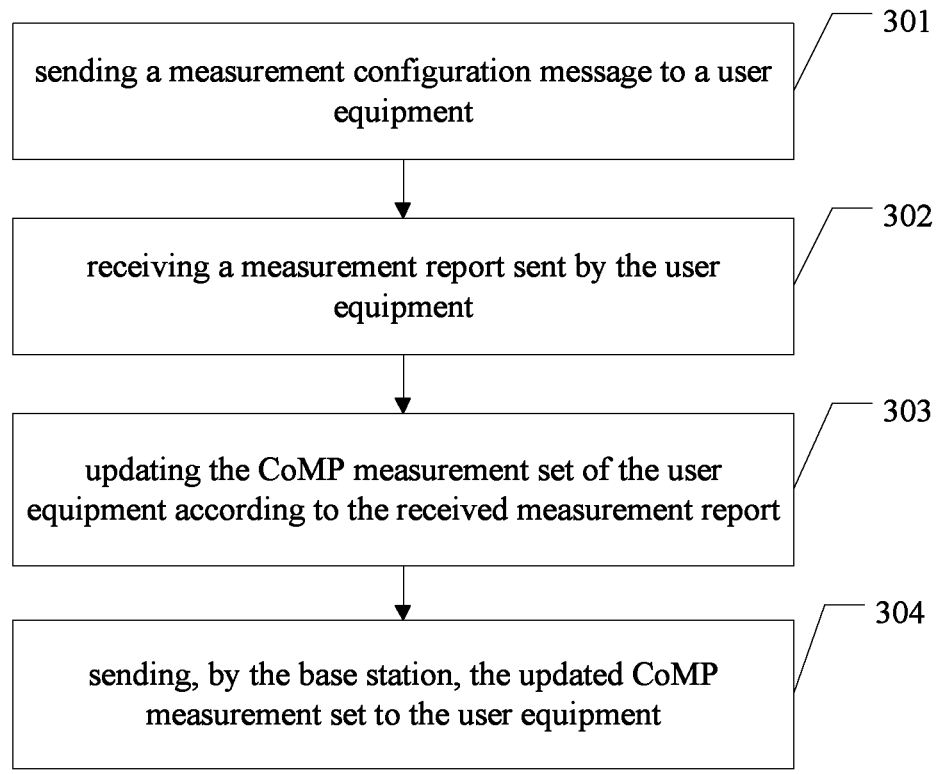
FIG. 3
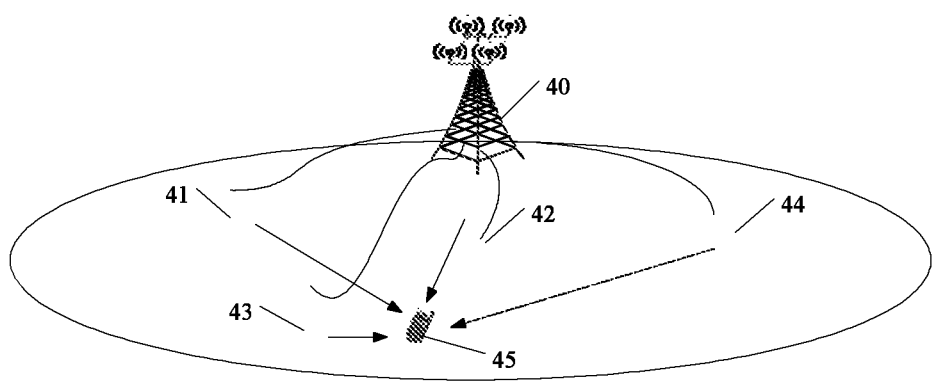
FIG. 4-a

FIG. 4-b

CELL MEASUREMENT METHOD, CELL RESOURCE SHARING METHOD, AND RELATED DEVICE

CROSS REFERENCE TO RELATED APPLICATIONS

This application is a continuation of U.S. patent application Ser. No. 14/143,909, filed on Dec. 30, 2013, which a continuation of International Patent Application No. PCT/CN2012/078570, filed on Jul. 12, 2012, which claims priority to Chinese Patent Application No. 201110194605.5, filed on Jul. 12, 2011. All of the afore-mentioned patent applications are hereby incorporated by reference in their entireties as if reproduced in full.

TECHNICAL FIELD

The present disclosure relates to communication technologies and, in particular, to a cell measurement method, a cell resource sharing method, and related devices.

BACKGROUND

In a wireless communication system, the coordinated multi-point transmission (CoMP, Coordinated Multi-Point transmission) technology is an important approach to improve the overall performance of the cell and the performance of the cell edge users.

The CoMP technology needs the support of multiple physical layer transmission technologies, such as the multiple-input multiple-output (MIMO, Multiple-Input Multiple-Output) technology adapted to the multi-cell joint transmission, the precoding technology, the network coding technology, the efficient channel estimation and joint detection technology. At the same time, the advanced and effective schemes of radio resource management is also important factors affecting the performance of the CoMP technology as well, for example, the distribution strategy of cell resource, the load balancing, the selection mechanism of the coordinated cells in the joint multi-point transmission, and effective handover strategy, and so on. The handover performance is a key index to appraise the performance of mobile communication system, and an effective handover strategy is the key to make a ubiquitous network for users.

In the current CoMP system, the user equipment (UE, User Equipment) obtains physical cell identities (PCI, physical cell identity) of neighbor cells by synchronizing the user equipment itself with the neighbor cells of the serving cell of the user equipment, then uses the obtained PCIs to measure the cell-specific reference signals (CRS, Cell-specific reference signals) of the cells corresponding to the PCIs, respectively, then reports the measurement result as a radio resource management (RRM, Radio Resource Management) measurement set to the base station communicating with the UE. The base station uses the RRM measurement set reported by the UE to evaluate the signal strength and signal quality of the signal received by the UE from each cell surrounding the UE, so as to decide the cell handover of this UE. In the above scheme, the base station distinguishes the different measurement results corresponding to different cells in the RRM measurement set via the PCIs. In the current CoMP system, when a cell sends resource position information of the CRS, other cells may use the time-frequency domain resources, which are occupied by this cell by sending the resource position information, to send resource information such as physical downlink control channel (PDCCH, Physical Downlink Control Channel) and physical downlink shared channel (PDSCH, Physical Downlink Shared Channel), therefore, this resource position information of the CRS is interfered and thus the measurement result of the CRS is inaccurate.

SUMMARY

Embodiments of the present disclosure provide a cell measurement method, a cell resource sharing method, and related devices, which are used to improve the accuracy of the measurement result, and enable the base station to distinguish different measurement results corresponding to different cells.

In order to resolve the above technical problem, the following technical solutions are provided by embodiments of the present disclosure:

In an aspect, the present disclosure provides a cell measurement method, including: receiving, by a user equipment (UE), a measurement configuration message sent by a base station, wherein the measurement configuration message comprises at least one physical cell identity and channel state information-reference signal (CSI-RS) configuration information corresponding to a measured cell, wherein the physical cell identity is used to indicate the measured cell, measuring the CSI-RS corresponding to the measured cell according to the CSI-RS configuration information, and obtaining a measurement result of the measuring, and sending the obtained measurement result of the measured cell and measurement object information of the measured cell to the base station via a measurement report.

In another aspect, the present disclosure provides a cell measurement method, including sending, by a base station, a measurement configuration message to a user equipment, wherein the measurement configuration message comprises at least one physical cell identity and channel state information-reference signal (CSI-RS) configuration information corresponding to a measured cell, wherein the physical cell identity is used to indicate the measured cell, and receiving a measurement report obtained by the user equipment according to the measurement configuration message, updating a coordinated multi-point transmission (CoMP) measurement set of user equipment according to the measurement report, and sending the updated CoMP measurement set to the user equipment.

In another aspect, the present disclosure provides a cell measurement method, including receiving, by a user equipment, a measurement configuration message sent by a base station, wherein the measurement configuration message comprises at least one physical cell identity and a configuration identity of a measured cell, and where the physical cell identity is used for indicating the measured cell, and the configuration identity is in one to one correspondence with the measured cell, measuring a channel reference signal (CRS) of a measured cell corresponding to the configuration identity, and obtaining a measurement result of the measuring, sending the obtained measurement result of the measured cell and the configuration identity of the measured cell to the base station via a measurement report.

In another aspect, the present disclosure provides a cell measurement method, including sending, by a base station, a measurement configuration message to a user equipment, wherein the measurement configuration message comprises at least one physical cell identity and a configuration identity of a measured cell, wherein the physical cell identity is used to indicate the measured cell, and the configuration identity is in one to one correspondence with the measured cell, receiving a measurement report obtained by the user equipment according to the measurement configuration message, updating a coordinated multi-point transmission (CoMP) measurement set of the user equipment according to the measurement report, and sending the updated CoMP measurement set to the user equipment.

In another aspect, the present disclosure provides a cell resource sharing method, including: sending, by a base station, a measurement configuration request message to another base station which is connected with the base station via an interface, to instruct the another base station to feed back measurement configuration information of a cell in a coverage of the another base station, wherein the measurement configuration information comprises at least one of: CSI-RS configuration information, antenna port information, the location information of the cell, and the antenna port information comprises an antenna port number and/or an amount of antenna ports, and receiving the measurement configuration information from the other base station, and sending it to the user equipment, UE.

In another aspect, the present disclosure provides a user equipment, including a receiving unit, configured to receive a measurement configuration message sent by a base station, wherein the measurement configuration message comprises at least one physical cell identity, and channel state information-reference signal (CSI-RS) configuration information corresponding to a measured cell, and where the physical cell identity is used to indicate the measured cell, a measuring and obtaining unit, configured to measure the CSI-RS corresponding to the measured cell according to the CSI-RS configuration information in the measurement configuration message received by the receiving unit, and obtaining a measurement result of the measuring a sending unit, configured to send the measurement result of the measured cell obtained by the measuring and obtaining unit and measurement object information indicating the measured cell, to the base station via a measurement report.

In another aspect, the present disclosure provides a base station, including a transceiving unit, configured to send a measurement configuration message to a user equipment, wherein the measurement configuration message comprises at least one physical cell identity and channel state information-reference signal (CSI-RS) configuration information corresponding to a measured cell, wherein the physical cell identity is used to indicate the measured cell; and to receive a measurement report obtained by the user equipment according to the measurement configuration message, an updating unit, configured to update a coordinated multi-point transmission (CoMP) measurement set of the user equipment according to the measurement report received by the transceiving unit, and where the transceiving unit is further configured to send the CoMP measurement set updated by the updating unit, to the user equipment.

In another aspect, the present disclosure provides a user equipment, including a receiving unit, configured to receive a measurement configuration message sent by a base station, where the cell measurement configuration message comprises at least one physical cell identity and a configuration identity of a measured cell, and where the physical cell identity is used for indicating the measured cell, and the configuration identity is in one to one correspondence with the measured cell, a measuring and obtaining unit, configured to measure a channel reference signal (CRS) of the measured cell corresponding to the configuration identity according to the configuration identity received by the receiving unit, and obtain a measurement result of the measuring; and a sending unit, configured to send the obtained measurement result of the measured cell obtained by the measuring and obtaining unit and the configuration identity of the measured cell received by the receiving unit to the base station via a measurement report.

In another aspect, the present disclosure provides a base station, including a transceiving unit, configured to send a measurement configuration message to a user equipment, where the measurement configuration message comprises at least one physical cell identity and a configuration identity of a measured cell, and where the physical cell identity is used to indicate the measured cell, and the configuration identity is in one to one correspondence with the measured cell, and to receive a measurement report obtained by the user equipment according to the measurement configuration message and an updating unit, configured to update a coordinated multi-point transmission (CoMP) measurement set of the user equipment according to the measurement report received by the transceiving unit, and the transceiving unit is further configured to send the CoMP measurement set updated by the updating unit to the user equipment.

In another aspect, the present disclosure provides a base station, including: a transceiving unit, configured to send a measurement configuration request message to another base station which is connected with the base station via an interface, to instruct the another base station to feed back measurement configuration information of a cell in a coverage of the another base station, where the measurement configuration information comprises at least one of: CSI-RS configuration information, antenna port information, and location information of the cell, and the antenna port information comprises an antenna port number and/or an amount of antenna ports, and to receive the measurement configuration information from the another base station; and a sending unit, configured to send the measurement configuration information of the another base station received by the transceiving unit to a user equipment (UE).

As can be seen, in embodiments of the present disclosure, by carrying at least one physical cell identity, and CSI-RS configuration information of a measured cell indicated by the physical cell identity in a measurement configuration message, the UE may measure the CSI-RS of the measured cell and obtain the measurement result, and the UE may send the measurement result of the measured cell and the measurement object information, which is used to indicate the measured cell, to the base station via the measurement report. On one hand, the UE can distinguish the resources of different measured cells which are indicated by the same physical cell identity according to the difference of the CSI-RS configuration information and/or the configuration identity of the measured cells which are indicated by the same physical cell identity in the measurement configuration message. On the other hand, the base station can distinguish the measurement results of different measured cells according to the measurement object information, so as to update effectively the CoMP measurement set of the UE. Furthermore, in the CoMP system, when a cell is sending CSI-RS resource position, other cell(s) will not use the time-frequency domain resources being occupied by the cell for sending CSI-RS resource position to send data, so that the interference between the data can be avoided, thus, the measurement result obtained by measuring the CSI-RS is more accurate than the measurement result obtained by measuring the CRS.

BRIEF DESCRIPTION OF DRAWINGS

To describe the technical solutions of embodiments of the present disclosure or in the prior art more clearly, the accompanying drawings used in the description of embodiments of the present disclosure or of the prior art are briefly described hereunder. Apparently, the described drawings are merely some embodiments of the present disclosure, and persons of ordinary skill in the art may still obtain other drawings based on these accompanying drawings without creative effort.

FIG. 3 is a schematic flowchart of a cell measurement method according to still another embodiment of the present disclosure;

FIG. 4-b is a schematic flowchart of a cell measurement method according to still another embodiment of the present disclosure;

DESCRIPTION OF EMBODIMENTS

Embodiments of the present disclosure provide a cell measurement method, a cell resource sharing method, and related devices.

To make the objectives, technical solutions, and advantages of embodiments of the present disclosure clearer, the technical solutions in embodiments of the present disclosure are hereinafter described clearly and completely with reference to the accompanying drawings in embodiments of the present disclosure. Apparently, the described embodiments are merely a part of embodiments of the present disclosure, rather than all embodiments of the present disclosure. All other embodiments obtained by persons of ordinary skill in the art based on embodiments of the present disclosure without creative effort shall fall within the protection scope of the present disclosure.

Figure 1:
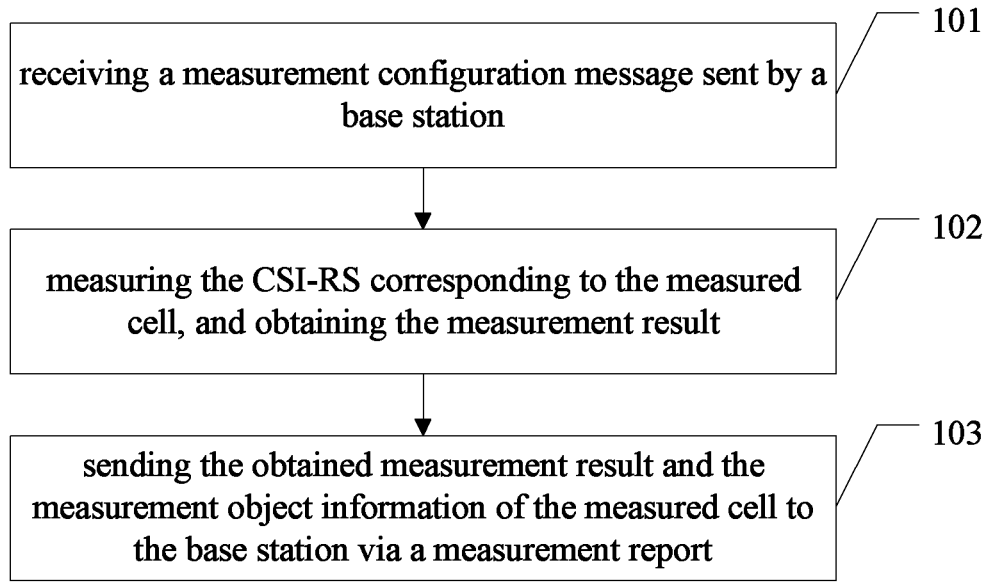
FIG. 1 is a schematic flowchart of a cell measurement method according to an embodiment of the present disclosure.

Taking a UE as a subject of description, the cell measurement method according to an embodiment of the present disclosure is described hereunder. With reference to FIG. 1, the cell measurement method according to an embodiment of the present disclosure includes:

Step 101: receiving a measurement configuration message sent by a base station.

In a CoMP system, multiple APs (AP, Access Point) which are geographically separated and scattered serve multiple UEs through different coordinated manners (for example, associated transmission, associated process and coordinated dispatch, etc). The base station updates the CoMP measurement set of the UE through receiving the measurement result of a RRM measurement set reported by the UE, and then issues the updated CoMP measurement set to the UE. The UE needs to report channel state information of the cell(s) in the received CoMP measurement set to the base station, so that the base station can schedule the cells in the CoMP measurement set. The base station sends a measurement configuration message to the UE, indicates the UE to measure the cell(s) which need(s) to be measured according to the measurement configuration message, and to report the measurement result as the measurement result of the RRM measurement set to this base station.

In embodiments of the present disclosure, the measurement configuration message includes at least one physical cell identity, and channel state information (CSI, Channel State Information)—reference signal (RS, Reference Signal) configuration information of each measured cell which is indicated by each physical cell identity; optionally, the measurement configuration message further includes a configuration identity which is in one to one correspondence with the measured cell, and optionally includes a measurement index number. The configuration identity may be at least one of: antenna port information of an AP to which the measured cell belongs, and the configuration index number of the CSI-RS configuration information of the measured cell. The antenna port information includes but not limited to an antenna port number and/or an amount of antenna ports. Of course, since each cell may correspond to different configuration information, in order to facilitate the management of different cells of the base station, cell numbers are optionally used to identify different cells, and a mapping relationship between the cell numbers and the CSI-RS configuration information of the cells may be established, thus the above configuration identity may also be the cell number of the measured cell, which will not be limited herein.

It should be noted that, in practical applications, the cells of multiple APs, which are in different geography positions, are configured with different antenna port information, and correspond to different CSI-RS configuration. The different measured cells, which are indicated by the same physical cell identity, have different CSI-RS configuration information. The CSI-RS configuration information is used to define CSI-RS configuration, and mainly includes antenna port information, resource configuration information, sub-frame configuration information and so on of CSI-RS. Different CSI-RS configuration information corresponds to different configuration index number, so that the base station can manage the CSI-RS configuration information of cells of multiple APs. These CSI-RS configuration may be distinguished in the time field, the frequency field, the code field and/or the space, for example, the sub-frame positions and/or the sending period of sending CSI-RS are different (with sub-frame offset) among CSI-RS configuration corresponding to different cells.

It is understandable that, if one AP includes multiple antennas, that is to say, one AP corresponds to multiple cells, then the cells of different antennas of this AP correspond to different CSI-RS configuration, and the plural antennas of this AP correspond to different antenna port information.

The AP may be a base station which includes entirely a resource management module, a baseband processing module and radio frequency unit, or may be a remote radio head (RRH, Remote Radio Head), a remote radio unit (RRU, Radio Remote Unit) or an antenna, and may also be a relay, which will not be limited herein.

The measurement configuration message may further optionally include measurement indication information of the measured cell, such as CSI-RSRP measurement indication information and/or CSI-RSRQ measurement indication information. The measurement configuration may further optionally include measurement reporting mode indication information, which is used to instruct the user equipment to perform measurement reporting for the measured cell periodically or based on event. If the reporting mode indicated by the measurement reporting mode indication information is reporting based on event, the measurement configuration may further include a configuration hysteresis value and hysteresis time, a maximum number of reported measured cells and report number, and/or other auxiliary configuration parameters, such as Layer-3 smoothing and filtering parameters. If the reporting mode indicated by the measurement reporting mode indication information is reporting periodically, the measure configuration message may further include a configuration report period. Certainly, each of the above parameters may be preset in the UE by default, which will not be limited herein.

The measurement configuration message may be a signaling based on radio resource control (RRC, Radio Resource Control) protocol, i.e., the RRC signaling, or a part of the RRC reconfiguration message, or a signaling based on medium/media access control (MAC, Medium/Media Access Control) protocol, i.e., the MAC signaling, which will not be limited herein.

Step 102: measuring the CSI-RS corresponding to the measured cell, and obtaining the measurement result.

After receiving the measurement configuration message sent by the base station, the UE may distinguish different measured cells, which are indicated by the same physical cell identity, according to the difference of CSI-RS configuration information of the measured cells and/or configuration identity (such as antenna port information or configuration index number of CSI configuration information) of the measured cells indicated by the same physical cell identity in the measurement configuration message. Optionally, the UE may further perform distinguishing measurement for the resources of different measured cells indicated by the same physical cell identity. The UE may use the CSI-RS configuration information of different measured cells to measure the CSI-RS of the corresponding measured cells, and obtain the measure results, such as the CSI-RSRP and/or CSI-RSRQ, of the measured cells. For example, in practical applications, UE may obtain a signal to interference plus noise ratio (SINR, Signal To Interference Plus Noise Ratio) of the received signal of the measured cell by measuring the CSI-RS of the measured cell, and then obtain the CSI-RSRP and/or CSI-RSRQ of the measured cell through the SINR calculation. Optionally, the UE may bind the measurement result with at least one of the following information in the measurement configuration message: the CSI-RS configuration information, the configuration identity of the measured cell, and the measurement index number. In practical applications, the UE may periodically measure and report the measurement result of the measured cell. If the measurement configuration message received by the UE includes measurement indication information, such as CSI-RSRP measurement indication information and/or CSI-RSRQ measurement indication information, the UE may obtain the measured value(s) required by the base station according to the measurement indication information, and report the measured value(s) as the measurement result to base station. For example, if the measurement request message includes the CSI-RSRP measurement indication information, the UE obtains the CSI-RSRP of the measured cell; if the measurement request message includes the CSI-RSRQ measurement indication information, the UE obtains the CSI-RSRQ of the measured cell; if the measure request message includes the CSI-RSRP measurement indication information and the CSI-RSRQ measurement indication information, the UE obtains the CSI-RSRP and the CSI-RSRQ of the measured cell. Certainly, the UE may also obtain the CSI-RSRP and/or CSI-RSRQ of the measured cell by default according to a predetermined setting when receiving the measurement configuration message, which will not be limited herein.

Step 103: sending the obtained measurement result and the measurement object information of the measured cell to the base station via a measurement report.

The UE sends the obtained measurement result of the measured cell and the measurement object information indicating the measured cell to the base station via a measurement report.

In practical applications, when the UE reports the measurement reports to the base station periodically, the measurement result may include measurement results such as the CSI-RSRP and/or CSI-RSRQ; when the UE reports the measurement reports to the base station based on event, the measurement result may include measurement results such as the CSI-RSRP and/or CSI-RSRQ, and/or measurement event indication information, where the measurement event indication information is used to indicate that the measured cell is a cell which satisfies a condition of joining a coordinated multi-point transmission (CoMP) measurement set, or a cell which satisfies a condition of leaving a CoMP measurement set. The measurement object information described above may include at least one of the CSI-RS configuration information, antenna port information of the access point to which the measured cell belongs, and the cell number of the measured cell in the measurement configuration message, or may also include a measurement index number.

The base station may distinguish the measurement results corresponding to different measured cells according to the measurement object information in the obtained measurement report, and update the CoMP measurement set of the UE according to the measurement result of each measured cell. Furthermore, the base station may perform other operations by using the measurement report, for example, the base station my perform a mobility management for the UE according to the measurement report.

The UE may also send the measurement report to the station by measuring and reporting based on event. In practical applications, the UE may calculate the measured cells, which satisfy the condition of joining the CoMP measurement set of the UE, or the condition of leaving the CoMP measurement set of the UE, by using the CSI-RSRP and/or CSI-RSRQ of each measured cell obtained by measuring. The UE may send only the CSI-RSRP and/or CSI-RSRQ of the measured cells which satisfy the condition of joining the CoMP measurement set to the base station, or the UE may send only the CSI-RSRP and/or CSI-RSRQ of the measured cells which satisfy the condition of leaving the CoMP measurement set to the base station. Or, after calculating the measured cells which satisfy the condition of joining and/or leaving the CoMP measurement set, the UE may distinguish the measured cells, which satisfy the condition of joining the CoMP measurement set of the UE and the measured cells which satisfy the condition of leaving the CoMP measurement set of the UE, by different measurement event indication information, and reports at least one of: the measurement event indication information, the measured value of the signal (CSI-RSRP and/or CSI-RSRQ) of the measured cells which satisfy the condition of joining the CoMP measurement set of the UE, and the measured value of signal (CSI-RSRP and/or CSI-RSRQ) of the measured cells which satisfy the condition of leaving the CoMP measurement set of the UE, to the base station as the measurement result. The base station may know which measured cells satisfy the condition of joining the CoMP measurement set of this UE and which measured cells satisfy the condition of leaving the CoMP measurement set of this UE according to the measurement event indication information. Of course, the UE may also send the CSI-RSRP and/or CSI-RSRQ of all the measured cells obtained by measuring to the base station, and the base station calculates the measured cells which satisfy the condition of joining or leaving the CoMP measurement set, so as to update the CoMP measurement set of this UE, which will not be limited herein.

As can be seen, in embodiments of the present disclosure, by carrying at least one physical cell identity and CSI-RS configuration information of a measured cell indicated by the physical cell identity in a measurement configuration message, the UE may measure the CSI-RS of the measured cell and obtain the measurement result, and the UE may send the measurement result of the measured cell and the measurement object information, which is used to indicate the measured cell, to the base station via the measurement report. On one hand, the UE can distinguish the resources of different measured cells which are indicated by the same physical cell identity according to the difference of the CSI-RS configuration information and/or the configuration identity of the measured cells which are indicated by the same physical cell identity in the measurement configuration message. On the other hand, the base station can distinguish the measurement results of different measured cells according to the measurement object information, so as to update effectively the CoMP measurement set of the UE. Furthermore, in the CoMP system, when a cell is sending CSI-RS resource position, other cell(s) will not use the time-frequency domain resources being occupied by the cell for sending CSI-RS resource position to send data, so that the interference between the data can be avoided, thus, the measurement result obtained by measuring the CSI-RS is more accurate than the measurement result obtained by measuring the CRS.

Figure 2:
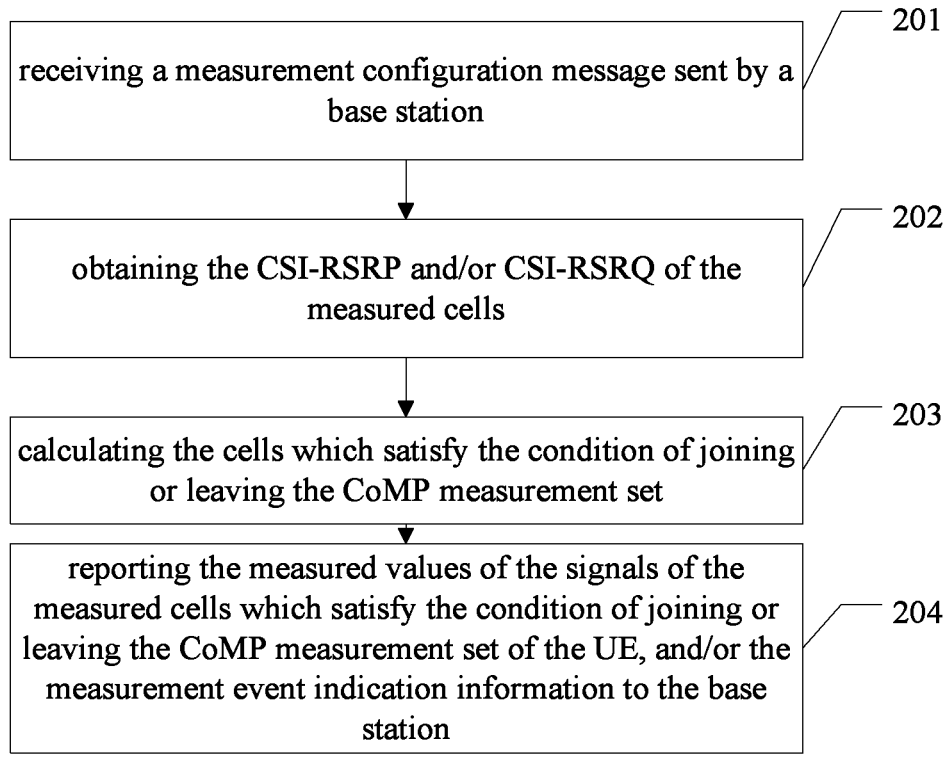
FIG. 2 is a schematic flowchart of a cell measurement method according to another embodiment of the present disclosure.

Taking the UE as a subject of description again, the cell measurement method according to an embodiment of the present disclosure is further described. With reference to FIG. 2, the cell measurement method according to another embodiment of the present disclosure includes:

Step 201: receiving a measurement configuration message sent by a base station.

Details about this step are similar as Step 101 of FIG. 1, and reference may be made to the description of Step 101, which will not be repeated herein.

Step 202: obtaining the CSI-RSRP and/or CSI-RSRQ of the measured cells.

After receiving the measurement configuration message sent by the base station, the UE may distinguish resources of different measured cells, which are indicated by the same physical cell identity, according to the difference of CSI-RS configuration information and/or configuration identity (such as antenna port information or configuration index number of CSI configuration information) of the measured cells indicated by the same physical cell identity in the measurement configuration message. Optionally, the UE may further perform distinguishing measurement for the resources of different measured cells indicated by the same physical cell identity. The UE may use the CSI-RS configuration information of different measured cells to measure the CSI-RS of the corresponding measured cells, and obtain the CSI-RSRP and/or CSI-RSRQ of the measured cells. For example, the UE may obtain a SINR of received signal of the measured cell by measuring the CSI-RS of the measured cell, then obtain the CSI-RSRP and/or CSI-RSRQ of the measured cell through the SINR calculation. Optionally, the UE may bind the measurement result with at least one of the following information in the measurement configuration message: the CSI-RS configuration information, the configuration identity of the measured cell, and the measurement index number.

In a practical application, UE may periodically measure and report the obtained CSI-RSRP and/or CSI-RSRQ of the measured cell as the measurement result of the measured cell to the base station. If the measurement configuration message received by the UE includes the measurement indication information, such as CSI-RSRP measurement indication information and/or CSI-RSRQ measurement indication information, the UE may obtain the measured value(s), which is required by the base station, according to the measurement indication information, and report the measured value(s) as the measurement result to base station. For example, if the measurement configuration message includes the CSI-RSRP measurement indication information, the UE obtains the CSI-RSRP of the measured cell; if the measurement request message includes the CSI-RSRQ measurement indication information, the UE obtains the CSI-RSRQ of the measured cell; if the measure request message includes the CSI-RSRP measurement indication information and the CSI-RSRQ measurement indication information, the UE obtains the CSI-RSRP and the CSI-RSRQ of the measured cell. Certainly, the UE may also obtain the CSI-RSRP and/or CSI-RSRQ of the measured cell by default according to a predetermined setting when receiving the measurement configuration message, which will not be limited herein.

Step 203: calculating the cells which satisfy the condition of joining or leaving the CoMP measurement set.

The UE may use the obtained CSI-RSRP and/or CSI-RSRQ of each measured cell to calculate the cells which satisfy the condition of or leaving the CoMP measurement set of the UE.

For the convenience of the description, in the following, the CSI-RSRP and/or CSI-RSRQ of each measured cell obtained by the UE will be called as measured value of the signal of the measured cell; the CSI-RSRP and/or CSI-RSRQ of the measured cell, of which the signal is the best in the current CoMP measurement set of the UE, will be called as measured value of the signal of the best cell. Thereby, the specific condition of judging whether a measured cell satisfies the condition of joining or leaving the CoMP measurement set of the UE may be: performing a comparison between a sum of the measured value of the signal of the measured cell plus the signal offset of the measured cell joining the CoMP measurement set of the UE (assumed as S1), and a sum of the weighted average of the measured values of the signals of all the cells in the current CoMP measurement set of the UE plus the signal hysteresis of the measured cell joining the CoMP measurement set of the UE (assumed as S2), if S1 is greater than S2 or equal to S2, determining that this measured cell satisfies the condition of joining the CoMP measurement set of the UE; if S1 is smaller than S2, determining that this measured cell satisfies the condition of leaving the CoMP measurement set of the UE. Or, the specific condition of judging may also be: performing a comparison between a sum of the measured value of the signal of the measured cell plus the signal offset of the measured cell joining the CoMP measurement set of the UE (assumed as S1), and a sum of the measured value of the signal of the best cell in the current CoMP measurement set of the UE (or the serving cell of the UE) plus the signal offset of the best cell, and also plus the signal hysteresis of the measured cell joining the CoMP measurement set of the UE (assumed as S2), if S1 is greater than S2 or equal to S2, determining that this measured cell satisfies the condition of joining the CoMP measurement set of the UE; if S1 is smaller than S2, determining that this measured cell satisfies the condition of leaving the CoMP measurement set of the UE. Of course, the condition of joining or leaving the CoMP measurement set of the UE may be set according to the actual situation, which will not be limited herein.

Step 204: reporting the measured values of the signals of the measured cells which satisfy the condition of joining or leaving the CoMP measurement set of the UE, and/or the measurement event indication information to the base station.

After Step 203, the UE may report the measured values of the signals (i.e., the CSI-RSRP and/or CSI-RSRQ) of the measured cells which satisfy the condition of joining or leaving the CoMP measurement set of the UE to the base station, or the UE may use different measurement event indication information to distinguish the measured cells which satisfy the condition of joining the CoMP measurement set of the UE and the measured cells which satisfy the condition of leaving the CoMP measurement set of the UE, then take at least one of the measurement event indication information, the measured values of the signals (the CSI-RSRP and/or CSI-RSRQ) of the measured cells which satisfy the condition of joining the CoMP measurement set of the UE, and the measured values of the signals (the CSI-RSRP and/or CSI-RSRQ) of the measured cells which satisfy the condition of leaving the CoMP measurement set of the UE as the measurement result, bind the measurement result with the corresponding measurement object information, and then report the bound measurement result and the corresponding measurement object information to the base station.

As can be seen, in embodiments of the present disclosure, by carrying at least one physical cell identity and CSI-RS configuration information of A measured cell indicated by the physical cell identity in a measurement configuration message, the UE may measure the CSI-RS of the measured cell and obtain the measurement result of the measured cell, and the UE may send the measurement result of the measured cell and the measurement object information, which is used to indicate the measured cell, to the base station via the measurement report. On one hand, the UE can distinguish the resources of different measured cells which are indicated by the same physical cell identity according to the difference of the CSI-RS configuration information and/or the configuration identity of the measured cells which are indicated by the same physical cell identity in the measurement configuration message. On the other hand, the base station can distinguish the measurement results of different measured cells according to the measurement object information, so as to update effectively the CoMP measurement set of the UE. Furthermore, in the CoMP system, when a cell is sending CSI-RS resource position, other cell(s) will not use the time-frequency domain resources being occupied by the cell for sending CSI-RS resource position to send data, so that the interference between the data can be avoided, thus, the measurement result obtained by measuring the CSI-RS, is more accurate than the measurement result obtained by measuring the CRS.

Taking the base station as a subject of description, the following describes a cell measurement method according to an embodiment of the present disclosure. With reference to FIG. 3, the cell measurement method according to another embodiment of the present disclosure includes:

Step 301: sending a measurement configuration message to a user equipment, UE.

The base station sends a measurement configuration message to a UE, where the measurement configuration message carries at least one physical cell identity and CSI-RS configuration information of each measured cell indicated by each physical cell identity; optionally, the measurement configuration message further includes the configuration identity which is in one to one correspondence with the measured cell, and optionally, includes a measurement index number. The configuration identity may be at least one of: antenna port information of an AP to which the measured cell belongs, a configuration index number of the CSI-RS configuration information of the measured cell, and a cell number of the measured cell. The antenna port information includes but not limited to antenna port number and/or an amount of antenna ports. Of course, since each cell may correspond to different configuration information, in order to facilitate the management of different cells of the base station, cell numbers are optionally used to identify different cells, and a mapping relationship between the cell numbers and the CSI-RS configuration information of the cells may be established, thus the above configuration identity may also be the cell number of the measured cell, which will not be limited herein.

It should be noted that, in practical applications, the cells of multiple APs, which are in different geography positions, are configured with different antenna port information, and correspond to different CSI-RS configuration. The different measured cells, which are indicated by the same physical cell identity, have different CSI-RS configuration information. The CSI-RS configuration information is used to define CSI-RS configuration, and mainly includes antenna port information, resource configuration information, sub-frame configuration information and so on of CSI-RS. Different CSI-RS configuration information corresponds to different configuration index number, so that the base station can manage the CSI-RS configuration information of cells of multiple APs. These CSI-RS configuration may be distinguished in the time field, the frequency field, the code field and/or the space, for example, the sub-frame positions and/or the sending period of sending CSI-RS are different (with sub-frame offset) among CSI-RS configuration corresponding to different cells.

It is understandable that, if one AP includes multiple antennas, that is, one AP corresponds to multiple cells, then the cells of different antennas of this AP correspond to different CSI-RS configuration, and the plural antennas of this AP correspond to different antenna port information.

The base station may carry measurement indication information in the measurement configuration message, such as CSI-RSRP measurement indication information and/or CSI-RSRQ measurement indication information, so as to instruct the UE to measure and obtain the CSI-RSRP and/or CSI-RSRQ of the measured cell. In practical applications, the base station may also send a measurement configuration request message to other base station(s) which is(are) connected with the base station via an interface, to instruct the other base station(s) to feed back the respective measurement configuration information of the cell(s) in the coverage of each other base station. The measurement configuration information includes but not limited to at least one of CSI-RS configuration information (may be the exclusive CSI-RS configuration information of a specific UE or a specific cell), and logical antenna port information. If there is only one cell belongs to the AP to which the cell described above belongs, the measurement configuration information may also include the label number of the AP and so on. For example, the base station may send a measurement configuration request message the other base station(s) through the interface X2 or the interface S1; the base station may also receive the measurement configuration information from the other base station(s) through the interface X2 or the interface S1; and the base station may also send the measurement configuration information of the cell(s) in the local coverage back to the other base station(s), for example the base station may send the measurement configuration information of the cell(s) in the local coverage back to the other base station(s) through the interface X2 or the interface S1, after the base station receives the measurement configuration request message from the other base station(s). Of course, the base station may initiatively send the measurement configuration information of the cell(s) in the local coverage back to the other base station(s), for example, may send the CSI-RS configuration information of the cell(s) in the local coverage, and the configuration identity of the cell(s) to the other base station(s) through the interface X2 or the interface S1 initiatively, which will not be limited herein.

The measurement configuration request message and/or the measurement configuration message may be a new and independent message, or may be incorporated into an X2 message or an S1 message in the prior art, for example, "resource status request/response (RESOURCE STATUS REQUEST/RESPONSE)", "X2 setup request/response (X2 SETUP REQUEST/RESPONSE)", "eNB configuration update/update acknowledge (ENB CONFIGURATION UPDATE/UPDATE ACKNOWLEDGE)" or "handover request/handover request acknowledge (HANDOVER REQUEST/HANDOVER REQUEST ACKNOWLEDGE)" or "load information (Load information)", etc, which will not be limited herein.

The AP may be a base station which includes entirely a resource management module, a baseband processing module and radio frequency unit, or may be an RRH, an RRU, or an antenna, and the AP may also be a relay, which will not be limited herein.

Step 302: receiving a measurement report sent by the user equipment.

The measurement report includes a measurement result and measurement object information. The measurement object information may include at least one of the following information in the measurement configuration message: the CSI-RS configuration information, the antenna port information of the access point to which the measured cell belongs, the configuration identity of the measured cell, the cell number of the measured cell, and the measurement index number. The measurement result may include at least one of: the CSI-RSRP of the measured cell, the CSI-RSRQ of the measured cell, and the measurement event indication information.

The base station receives the measurement report fed back by the UE. The base station may distinguish the measurement results of different measured cells according to the measurement object information.

Step 303: updating the CoMP measurement set of the user equipment according to the received measurement report.

After receiving the measurement report sent by the UE, the base station may distinguish the CSI-RSRPs and/or CSI-RSRQs of different measured cells according to the measurement object information, and updates the CoMP measurement set of the UE. Specifically, the base station may calculate the measured cells which satisfy the condition of joining or leaving the CoMP measurement set of the UE, according to the measurement results of the measured cells (such as CSI-RSRP and/or CSI-RSRQ of the measured cells) in the measurement report. If the measured cell is a cell in the current CoMP measurement set of the UE, when the base station calculates that the measured cell does not satisfy the condition of joining the CoMP measurement set of the UE (which means the measured cell satisfies the condition of leaving the CoMP measurement set of the UE) currently, the base station removes the measured cell from the CoMP measurement set of the UE. Similarly, if a measured cell is not in the current CoMP measurement set of the UE, when the base station calculates that the measured cell satisfies the condition of joining the CoMP measurement set of the UE currently, the base station moves the measured cell into the CoMP measurement set of the UE. Of course, the UE may also calculate the measured cells which satisfy the condition of joining and/or leaving the CoMP measurement set of the UE, and then send the measurement result of the measured cells which satisfy the condition of joining or leaving the CoMP measurement set (such as the CSI-RSRP of the measured cells and/or CSI-RSRQ of the measured cells and/or the measurement event indication information) to the base station, then the base station further judges if the measured cells reported by the UE satisfy the condition of joining the CoMP measurement set of the UE, and updates the CoMP measurement set of the UE.

Of course, in actual applications, the base station may also use the measurement report to perform other operations, for example, the base station may perform a mobility management for the UE according to the measurement report.

Step 304: sending, by the base station, the updated CoMP measurement set to the user equipment.

After completing the update of the CoMP measurement set of the UE, the base station sends the updated CoMP measurement set to the UE.

As can be seen, in embodiments of the present disclosure, by carrying at least one physical cell identity and the CSI-RS configuration information of a measured cell indicated by the physical cell identity in a measurement configuration message, the UE may measure the CSI-RS of the measured cell and obtain the measurement result, and the UE may send the measurement result of the measured cell and the measurement object information, which is used to indicate the measured cell, to the base station via the measurement report. On one hand, the UE can distinguish the resources of different measured cells which are indicated by the same physical cell identity according to the difference of the CSI-RS configuration information and/or the configuration identity of the measured cells which are indicated by the same physical cell identity in the measurement configuration message. On the other hand, the base station can distinguish the measurement results of different measured cells according to the measurement object information, so as to update effectively the CoMP measurement set of the UE. Furthermore, in the CoMP system, when a cell is sending CSI-RS resource position, other cell(s) will not use the time-frequency domain resources being occupied by the cell for sending CSI-RS resource position to send data, so that the interference between the data can be avoided, thus, the measurement result obtained by measuring the CSI-RS, is more accurate than the measurement result obtained by measuring the CRS.

Figure 4:
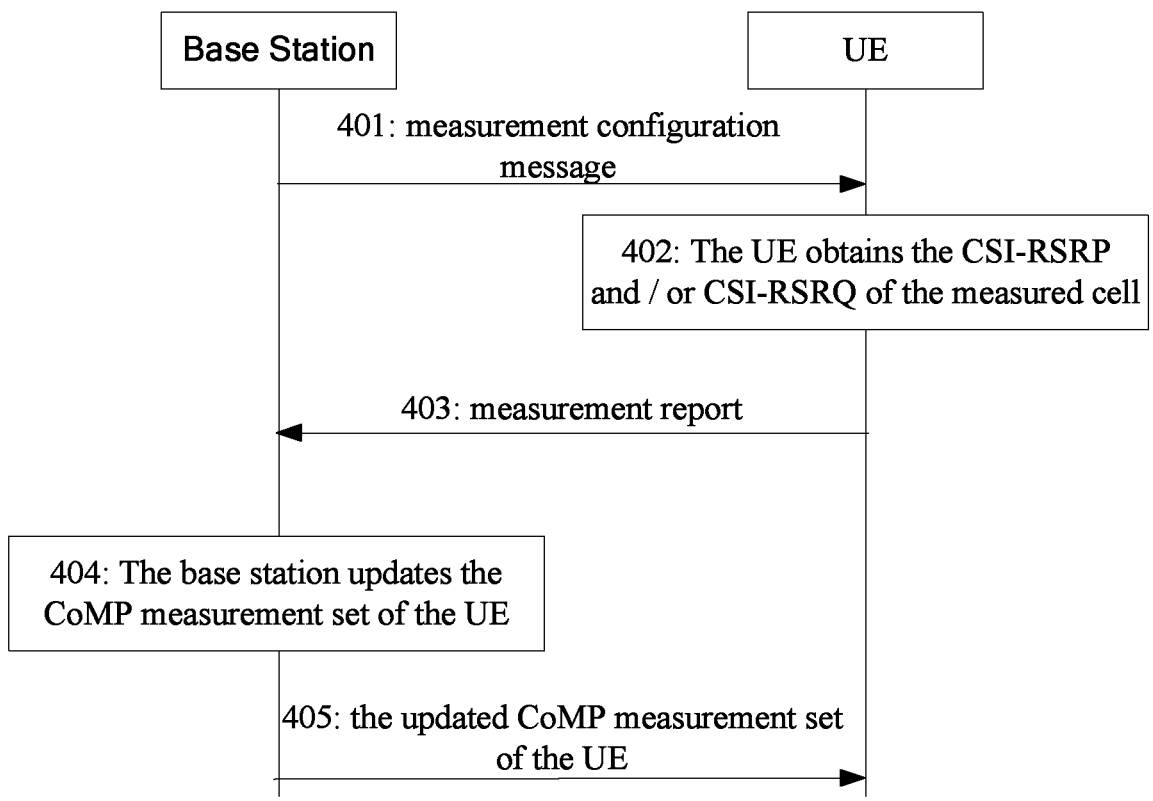
FIG. 4-a is a schematic diagram of a network architecture in an application scenario according to an embodiment of the present disclosure.

To make the technical solutions of the present disclosure more understandable, the following describes, taking a specific application scenario as an example, a cell measurement method according to an embodiment of the present disclosure. Assuming the schematic diagram of a network architecture in an embodiment of the present disclosure is as shown in FIG. 4-*a*, there are four access points, which are AP41, AP42, AP43 and AP44, belonging to base station 40, each AP includes a cell, AP41, AP42, AP43 and AP44 have the same PCI, and the current CoMP measurement set of the user equipment 45 includes AP41, AP42, and AP43. Referring to FIG. 4-*b*, the interaction process between the base station and the UE in the above application scenario includes:

Step 401: The base station sends a measurement configuration message to the UE.

The base station sends a measurement configuration message to the UE, where the measurement configuration message includes the PCIs of AP41, AP42, AP43 and AP44, the CSI-RS configuration information of the measured cell belonging to each AP, and the configuration identities which are in one to one correspondence with each measured cell.

The base station may also carry the measurement indication information in the measurement configuration message, such as the CSI-RSRP measurement indication information and/or CSI-RSRQ measurement indication information, so as to instruct the UE to obtain the CSI-RSRP and/or CSI-RSRQ of the measured cell.

The configuration identities may be the antenna ports information of the four APs, and/or the configuration index numbers of the CSI-RS configuration information of the cells belonging to the four APs. Of course, the configuration identities may also be the cell numbers of the cells belonging to the four APs, which will not be limited herein.

Step 402: The UE obtains the CSI-RSRP and/or CSI-RSRQ of the measured cell.

In embodiments of the present disclosure, after receiving the measurement request message sent by the base station, the UE performs the CSI-RS measurement for the cells belonging to the four APs, respectively, according to the CSI-RS configuration information in the measurement request message, and obtains the CSI-RSRP and/or CSI-RSRQ of the cells belonging to the four APs, by default or according to the CSI-RSRP measurement indication information and/or i CSI-RSRQ measurement indication information in the measurement configuration message.

Step 403: The UE sends the measurement report to the base station.

The UE takes the obtained CSI-RSRP and/or CSI-RSRQ of the measured cell as the measurement result, and sends the measurement result and the measurement object information to the base station via the measurement report.

The measurement object information may include the CSI-RS configuration information, and/or antenna port information of the four APs, and/or the corresponding measurement index number in the measurement configuration message.

Step 404: The base station updates the CoMP measurement set of the UE.

After receiving the CSI-RSRP and/or CSI-RSRQ of the measured cell sent by the UE, the base station may distinguish the CSI-RSRP and/or CSI-RSRQ corresponding to different measured cells according to the measurement object information in the obtained measurement report, and update the CoMP measurement set of the UE according to the CSI-RSRP and/or CSI-RSRQ of each measured cell.

Step 405: The base station issues the updated CoMP measurement set of the UE to the UE.

The AP may be a base station which includes entirely an resource management module, a baseband processing module and radio frequency unit, or may be an RRH, an RRU, or an antenna, and the AP may also be a relay, which will not be limited herein.

As can be seen, in embodiments of the present disclosure, by carrying at least one physical cell identity, and the CSI-RS configuration information of at least one measured cell indicated by the physical cell identity in a measurement configuration message, the UE may measure the CSI-RS of the measured cell and obtain the measurement result, and the UE may send the measurement result of the measured cell and the measurement object information, which is used to indicate the measured cell, to the base station via the measurement report. On one hand, the UE can distinguish the resources of different measured cells which are indicated by the same physical cell identity according to the difference of the CSI-RS configuration information and/or the configuration identity of the measured cells which are indicated by the same physical cell identity in the measurement configuration message. On the other hand, the base station can distinguish the measurement results of different measured cells according to the measurement object information, so as to update effectively the CoMP measurement set of the UE. Furthermore, in the CoMP system, when a cell is sending CSI-RS resource position, other cell(s) will not use the time-frequency domain resources being occupied by the cell for sending CSI-RS resource position to send data, so that the interference between the data can be avoided, thus, the measurement result obtained by measuring the CSI-RS, is more accurate than the measurement result obtained by measuring the CRS.

Figure 5:
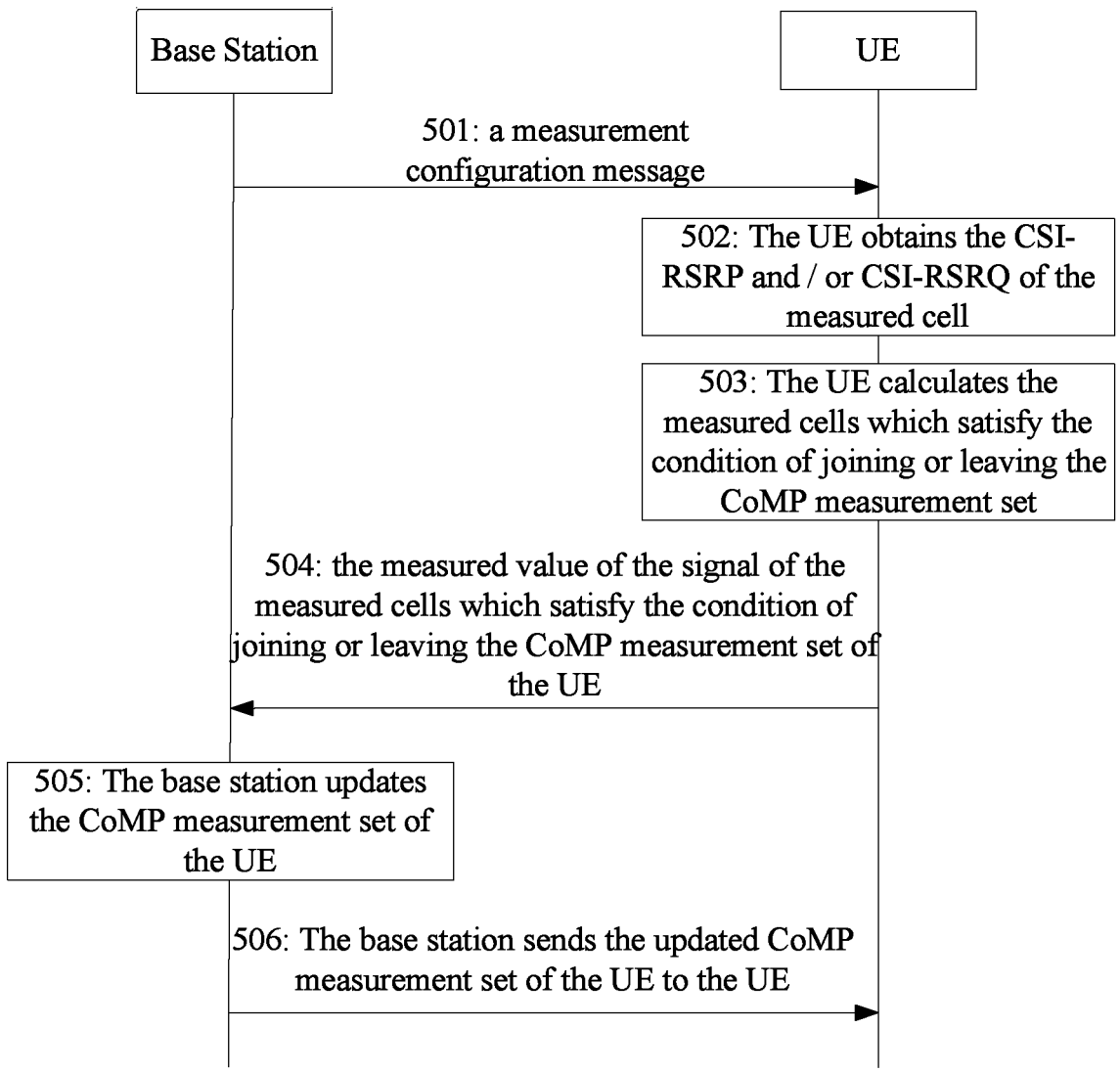
FIG. 5 is a schematic flowchart of a cell measurement method according to still another embodiment of the present disclosure.

The following further describes, taking a specific application scenario as an example, a cell measurement method according to an embodiment of the present disclosure. Assuming the schematic diagram of a network architecture of the embodiment of the present disclosure is similarly as shown in FIG. 4-*a*, there are four access points, which are AP41, AP42, AP43 and AP44, belonging to base station 40, each AP includes a cell, AP41, AP42, AP43 and AP44 have the same PCI, and the current CoMP measurement set of the user equipment 45 include AP41, AP42, and AP43. Referring to FIG. 5, the specific interaction process includes:

Step 501: The base station sends a measurement configuration message to the UE.

The base station sends a measurement configuration message to the UE, where the measurement configuration message includes the PCIs of AP41, AP42, AP43 and AP44, the CSI-RS configuration information of the measured cell belonging to each AP, and the configuration identities which are in one to one correspondence with each measured cell.

The base station may also carry the measurement indication information in the measurement configuration message, such as the CSI-RSRP measurement indication information and/or CSI-RSRQ measurement indication information, so as to instruct the UE to obtain the CSI-RSRP and/or CSI-RSRQ of the measured cell.

The configuration identities may be the antenna ports information of the four APs, and/or the configuration index numbers of the CSI-RS configuration information of the cells belonging to the four APs. Of course, the configuration identities may also be the cell numbers of the cells belonging to the four APs, which will not be limited herein.

Step 502: The UE obtains the CSI-RSRP and/or CSI-RSRQ of the measured cell.

In embodiments of the present disclosure, after receiving the measurement request message sent by the base station, the UE performs the CSI-RS measurement for the cells belonging to the four APs, respectively, according to the CSI-RS configuration information in the measurement request message, and obtains the CSI-RSRP and/or CSI-RSRQ of the cells belonging to the four APs, by default or according to the CSI-RSRP measurement indication information and/or CSI-RSRQ measurement indication information in the measurement configuration message.

Step 503: The UE calculates the measured cells which satisfy the condition of joining or leaving the CoMP measurement set.

The UE may use the obtained CSI-RSRP and/or CSI-RSRQ of each measured cell to calculate the cells which satisfy the condition of joining or leaving the CoMP measurement set of the UE.

For the convenience of the description, in the following, the CSI-RSRP and/or CSI-RSRQ of each measured cell obtained by the UE will be called as measured value of the signal of the measured cell; the CSI-RSRP and/or CSI-RSRQ of the measured cell, which has the optimum signal in the current CoMP measurement set of the UE, will be called as measure value of the signal of the best cell. Thereby, the specific condition of judging whether a measured cell satisfies the condition of joining or leaving the CoMP measurement set of the UE may be: performing a comparison between a sum of the measured value of the signal of the measured cell plus the signal offset of the measured cell joining the CoMP measurement set of the UE (assumed as S1), and a sum of the weighted average of the measured values of the signals of all the cells in the current CoMP measurement set of the UE plus the signal hysteresis of the measured cell joining the CoMP measurement set of the UE (assumed as S2), if S1 is greater than S2 or equal to S2, determining that this measured cell satisfies the condition of joining the CoMP measurement set of the UE; if S1 is smaller than S2, determining that this measured cell satisfies the condition of leaving the CoMP measurement set of the UE. Or, the specific condition of judging may also may be: performing a comparison between a sum of the measured value of the signal of the measured cell plus the signal offset of the measured cell joining the CoMP measurement set of the UE (assumed as S1), and a sum of the measured value of the signal of the best cell in the current CoMP measurement set of the UE (or the serving cell of the UE) plus the signal offset of the best cell, and also plus the signal hysteresis of the measured cell joining the CoMP measurement set of the UE (assumed as S2), if S1 is greater than S2 or equal to S2, determining that this measured cell satisfies the condition of joining the CoMP measurement set of the UE; if S1 is smaller than S2, determining that this measured cell satisfies the condition of leaving the CoMP measurement set of the UE. Of course, the condition of joining or leaving the CoMP measurement set of the UE may be set according to the actual situation, which will not be limited herein.

Step 504: The UE reports the measured value of the signal of the measured cells which satisfy the condition of joining or leaving the CoMP measurement set of the UE, and/or the measurement event indication information to the base station.

After Step 503, the UE may report the measured value of the signal (i.e., the CSI-RSRP and/or CSI-RSRQ) of the measured cell which satisfies the condition of joining or leaving the CoMP measurement set of the UE to the base station, or the UE may use measurement event indication information to distinguish the measured cells which satisfy the condition of joining the CoMP measurement set of the UE and the measured cells which satisfy the condition of leaving the CoMP measurement set of the UE, then take at least one of the measurement event indication information, the measured value of the signal (the CSI-RS RP and/or CSI-RSRQ) of the measured cells which satisfy the condition of joining the CoMP measurement set of the UE, and the measured value of the signal (the CSI-RSRP and/or CSI-RSRQ) of the measured cells which satisfy the condition of leaving the CoMP measurement set of the UE as the measurement result, bind the measurement result with the corresponding measurement object information, and then report the bound measurement result and the corresponding measurement object information to the base station.

Assuming that, in Step 503, the UE determines that the measured cells belonging to the three access points AP41, AP42, and AP44 satisfy the condition of joining the CoMP measurement set of the UE, and the measured cell belonging to AP43 satisfies the condition of leaving the CoMP measurement set of the UE, then the UE may bind the measured value of the signal (the CSI-RSRP and/or CSI-RSRQ) of the cells belonging to the three access points AP41, AP42 and AP44, which satisfy the condition of joining the CoMP measurement set of the UE, with the measurement object information of the cells belonging to the three access points correspondingly, and then send the bound result and measurement object information to the base station. Or, the UE may bind the measured value of the signal (the CSI-RSRP and/or CSI-RSRQ) of the cell belonging to the AP43, which satisfies the condition of leaving the CoMP measurement set of the UE, with the measurement object information of the cell belonging to the AP43, and then send the bound result and measurement object information to the base station. Or, the UE may use different measurement event indication information to indicate that the cells belonging to the three access points AP41, AP42 and AP44 satisfy the condition of joining the CoMP measurement set of the UE, and the cell of AP43 satisfies the condition of leaving the CoMP measurement set of the UE, and bind the measurement event indication information, and/or the measured value of the signal (the CSI-RSRP and/or CSI-RSRQ) of the cells belonging to the three access points AP41, AP42 and AP44, and/or the measured value of the signal (the CSI-RSRP and/or CSI-RSRQ) of the cell belonging to the AP43 with the corresponding measurement object information, and then send them to the base station, which will not be limited herein.

Step 505: The base station updates the CoMP measurement set of the UE.

After receiving the measured value of the signal of the measured cell sent by the UE in step 504, the base station may further determine the cells which satisfy the condition of joining the CoMP measurement set of the UE according to a predetermined strategy (such as a strategy that the UE only reports the cells which satisfy the condition of joining the CoMP measurement set of the UE, or the UE only reports the cells which satisfy the condition of leaving the CoMP measurement set of the UE), or according to the received measurement event indication information, and then the base station updates the CoMP measurement set of the UE.

If the base station determines that currently the cells belonging to the three access points AP41, AP42, and AP44 satisfy the condition of joining the CoMP measurement set of the UE, and the cell belonging to AP43 satisfies the condition of leaving the CoMP measurement set of the UE, then the base station updates the cells included in the current CoMP measurement set of the UE to the cells belonging to AP41, AP42, and AP44.

Step 506: The base station sends the updated CoMP measurement set of the UE to the UE.

The AP may be a base station which includes entirely a resource management module, a baseband processing module and radio frequency unit, or may be an RRH, an RRU, or an antenna, and the AP may also be a relay, which will not be limited herein.

As can be seen, in embodiments of the present disclosure, by carrying at least one physical cell identity and the CSI-RS configuration information of a measured cell indicated by the physical cell identity in a measurement configuration message, the UE may measure the CSI-RS of the measured cell and obtain the measurement result, and the UE may send the measurement result of the measured cell and the measurement object information, which is used to indicate the measured cell, to the base station via the measurement report. On one hand, the UE can distinguish the resources of different measured cells which are indicated by the same physical cell identity according to the difference of the CSI-RS configuration information and/or the configuration identity of the measured cells which are indicated by the same physical cell identity in the measurement configuration message. On the other hand, the base station can distinguish the measurement results of different measured cells according to the measurement object information, so as to update effectively the CoMP measurement set of the UE. Furthermore, in the CoMP system, when a cell is sending CSI-RS resource position, other cell(s) will not use the time-frequency domain resources being occupied by the cell for sending CSI-RS resource position to send data, so that the interference between the data can be avoided, thus, the measurement result obtained by measuring the CSI-RS, is more accurate than the measurement result obtained by measuring the CRS.

Figure 6:
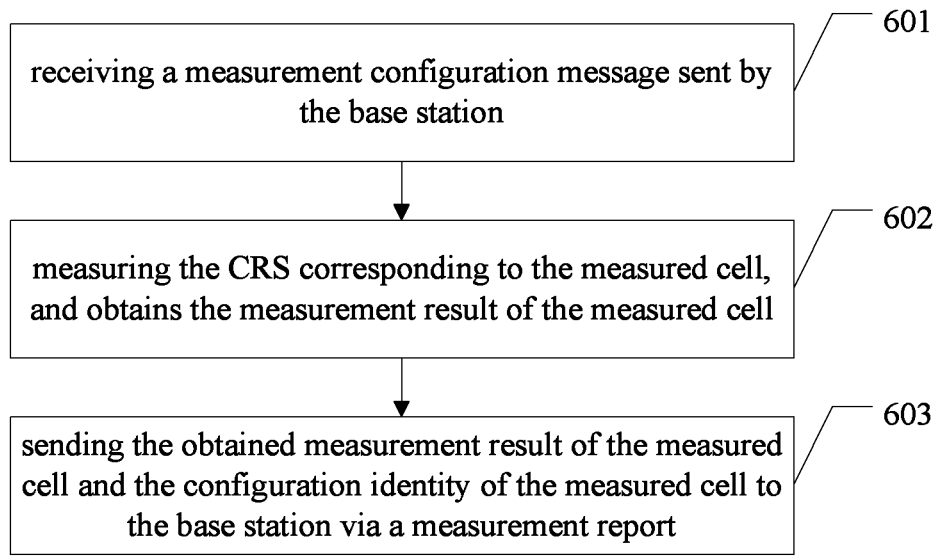
FIG. 6 is a schematic flowchart of a cell measurement method according to still another embodiment of the present disclosure.
Figure 7:
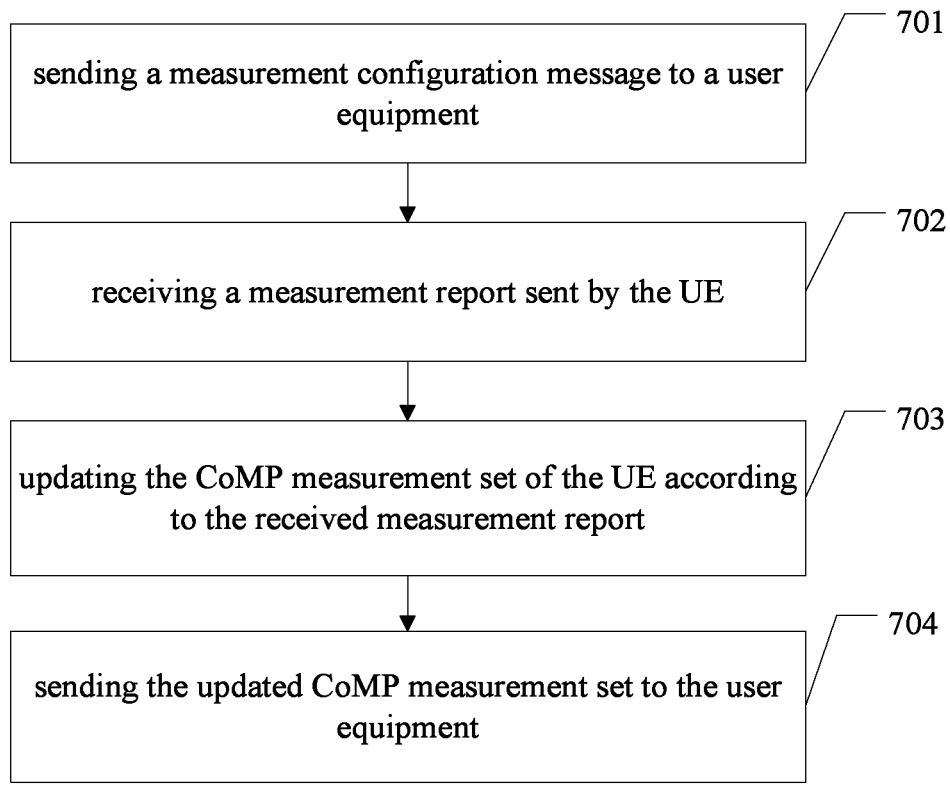
FIG. 7 is a schematic flowchart of a cell measurement method according to still another embodiment of the present disclosure.

Taking the UE as the subject of description, the following describes a cell measurement method according to another embodiment of the present disclosure, with reference to FIG. 6, the method includes:

Step 601: The UE receives a measurement configuration message sent by the base station.

In the embodiment of the present disclosure, the measurement configuration message includes at least one physical cell identity and a configuration identity of the measured cell indicated by each physical cell identity. The configuration identity may be the antenna port information of the AP to which a cell belongs, where the antenna port information includes antenna port number and/or an amount of antenna ports.

It should be noted that, in practical applications, the cells of multiple APs, which are in different geography positions, may be configured with a same physical cell identity, and with different antenna port information, such as antenna port number and/or quantity of antenna ports.

It is understandable that, if one AP includes multiple antennas, that is to say, one AP corresponds to multiple cells, then the cells belonging to different antennas of this AP correspond to different antenna port information, such as antenna port number and/or an amount of antenna ports.

The AP may be a base station which includes entirely a resource management module, a baseband processing module and radio frequency unit, or may be an RRH, an RRU, or an antenna, and the AP may also be a relay, which will not be limited herein.

The measurement configuration message may further include measurement indication information of the measured cell, such as RSRP measurement indication information and/or RSRQ measurement indication information; and/or measurement reporting mode indication information, which is used to instruct the user equipment to perform measurement reporting for the measured cell periodically or based on event. If the reporting mode indicated by the measurement reporting mode indication information is reporting based on event, the measurement configuration may further include a configuration hysteresis value and hysteresis time, a maximum number of reported measured cells and report number, and/or other auxiliary configuration parameters, such as Layer-3 smoothing and filtering parameters. If the reporting mode indicated by the measurement reporting mode indication information is reporting periodically, the measure configuration message may further include a configuration report period. Certainly, each of the above parameters may be preset in the UE by default, which will not be limited herein.

The measurement configuration message may be a RRC signaling, or a part of the RRC reconfiguration message, or a MAC signaling, which will not be limited herein.

Step 602: The UE measures the CRS corresponding to the measured cell, and obtains the measurement result of the measured cell.

After receiving the measurement request message sent by the base station, the UE may distinguish different CRS configuration information of different measured cells according to the configuration identity, such as the antenna port information, in the measurement configuration message, and use the CRS configuration information to measure the CRS of the measured cell, and obtain the measurement result of the measured cell, such as the RSRP and/or RSRQ of the measured cell.

In a practical application, UE may measure and obtain the RSRP and/or RSRQ of the measured cell periodically. If the measurement request message received by the UE includes the measurement indication information, such as the RSRP measurement indication information and/or RSRQ measurement indication information, the UE may obtain the measured value(s), which is required by base station, according to the measurement indication information. For example, if the measurement request message includes the RSRP measurement indication information, the UE obtains the RSRP of the measured cell; if the measurement request message includes the RSRQ measurement indication information, the UE obtains the RSRQ of the measured cell; if the measure request message includes the RSRP measurement indication information and the RSRQ measurement indication information, the UE obtains the RSRP and RSRQ of the measured cell. Certainly, the UE may also obtain the RSRP and/or RSRQ of the measured cell by default according to a predetermined setting when receiving the measurement configuration message, which will not be limited herein.

Step 603: The UE sends the obtained measurement result of the measured cell and the configuration identity of the measured cell to the base station via a measurement report.

After binding the measurement result (such as the RSRP and/or RSRQ) of the measured cell obtained by measuring with the configuration identity of the measured cell, the UE sends the measurement result to the base station via a measurement report. The base station may distinguish the measurement results corresponding to different measured cells according to the configuration identity, and update the CoMP measurement set of the UE according to the measurement result of each measured cell.

For example, after receiving the measurement configuration message from the base station, the UE may report the RSRP and/or the RSRQ of each measured cell to the base station periodically, or, the UE may report the RSRP and/or the RSRQ of each measured cell to the base station based on event after obtaining the RSRP and/or the RSRQ of each measured cell. For example, in practical applications, the UE may calculate the measured cells, which satisfy the condition of joining the CoMP measurement set of the UE or satisfy the condition of leaving the CoMP measurement set of the UE, by using the obtained RSRP and/or RSRQ of each measured cell, and the UE may only send the RSRP and/or RSRQ of the measured cells which satisfy the condition of joining the CoMP measurement set to the base station, or the UE may only send the RSRP and/or RSRQ of the measured cells which satisfy the condition of leaving the CoMP measurement set to the base station. Or, the UE may calculate the measured cells which satisfy the condition of joining and/or leaving the CoMP measurement set according to the obtained RSRP and/or RSRQ of each measured cell, and distinguish the measured cells which satisfy the condition of joining and/or leaving the CoMP measurement set of the UE by using different measurement event indication information, and send the measurement event indication information, and/or the measured value of the signal (RSRP and/or RSRQ) of the measured cells which satisfy the condition of joining the CoMP measurement set of the UE, and/or the measured value of the signal (RSRP and/or RSRQ) of the measured cells which satisfy the condition of leaving the CoMP measurement set of the UE to the base station. The base station may know which measured cells satisfy the condition of joining the CoMP measurement set of the UE and which measured cells satisfy the condition of leaving the CoMP measurement set of the UE according to the measurement event indication information. Of course, the UE may also send the RSRP and/or RSRQ of all the measured cells obtained by measuring to the base station, and the base station calculates the cells which satisfy the condition of joining or leaving the CoMP measurement set, and updates the CoMP measurement set of the UE, which will not be limited herein.

Furthermore, the base station may perform a measurement management and a mobility management for the UE according to the RSRP and/or RSRQ of each measured cell, for example, turn on the different frequency measurement, or perform an inter-cell handover, or perform inter-cell interference coordination (ICIC, Inter-Cell Interference Coordination), and so on.

As can be seen, in embodiments of the present disclosure, by carrying the configuration identities of the measured cells belonging to the measured access point in the measurement configuration message, the UE can distinguish different measured cells according to the configuration identities in the measurement configuration message, bind the measurement result obtained by performing the CRS measurement for the measured cell with the configuration identity of the measured cell, and then send the bound measurement result and configuration identity to the base station, so that the base station can distinguish the measurement result of different measured cells according to the configuration identities, thus, the CoMP measurement set of the UE can be updated effectively.

Taking the base station as the subject of description, the following describes a cell measurement method according to still another embodiment of the present disclosure, with reference to FIG. 6, the method includes:

Step 701: sending a measurement configuration message to a user equipment (UE).

The base station sends a measurement configuration message to the UE, where the measurement configuration message includes at least one physical cell identity, and the configuration identity of the measured cell indicated by each physical cell identity. The configuration identity may be the antenna port information of the AP to which the cell belongs, and the antenna port information includes antenna port number and/or the amount of antenna ports. The base station may also carry the measurement indication information, such as the RSRP measurement indication information and/or RSRQ measurement indication information, in the measurement configuration message, so as to instruct the UE to obtain the RSRP and/or RSRQ of the measured cell.

In practical applications, the base station may also send a measurement configuration request message to other base station(s) which is(are) connected with the base station via an interface, to instruct the other base station(s) to feed back the respective measurement configuration information such as the CRS configuration information of the cell(s) in the coverage of each other base station and the configuration identity of the cell, for example, the base station may send the measurement configuration request message to the other base station(s) through the interface X2 or the interface S1; and the base station may also send the measurement configuration information of the cell(s) in the local coverage, such as the CRS configuration information and the configuration identity of the cell, back to the other base station(s) after receiving the measurement configuration request message from the other base station(s). Of course, the base station may also send the measurement configuration information of the cell(s) in the local coverage back to the other base station(s) after sending a measurement configuration request message to other base station(s) initiatively. In actual applications, the base station may send the measurement configuration information of the cell(s) in the local coverage to the other base station(s) through the interface X2 or the interface S1.

It should be noted that, in practical applications, the cells of multiple APs, which are in different geography positions, may be configured with a same physical cell identity, and with different antenna port information, such as antenna port number and/or the amount of antenna ports.

It is understandable that, if one AP includes multiple antennas, that is to say, one AP corresponds to multiple cells, then the cells belonging to different antennas of the AP correspond to different antenna port information.

The AP may be a base station which includes entirely a resource management module, a baseband processing module and radio frequency unit, or may be an RRH, an RRU, or an antenna, and the AP may also be a relay, which will not be limited herein.

Step 702: receiving a measurement report sent by the UE.

The measurement report includes the measurement results (such as the RSRP and/or RSRQ of the measured cell) and the configuration identities of the measured cells, and the base station may distinguish the measurement results of different measured cells according to the configuration identities of the measured cells.

Step 703: updating the CoMP measurement set of the UE according to the received measurement report.

After receiving the measurement report sent by the UE, the base station may distinguish measurement results of different measured cells according to the configuration identities in the measurement report, and updates the CoMP measurement set of the UE. For example, the base station may calculate the measured cells which satisfy the condition of joining the CoMP measurement set of the UE according to the RSRP and/or RSRQ of the measured cell. If the measured cell is a cell in the current CoMP measurement set of the UE, when the base station calculates that the measured cell does not satisfy the condition of joining the CoMP measurement set of the UE (which means the measured cell satisfies the condition of leaving the CoMP measurement set of the UE) currently, the base station removes the measured cell from the CoMP measurement set of the UE. Similarly, if the measured cell is not in the current CoMP measurement set of the UE, when the base station calculates that the measured cell satisfies the condition of joining the CoMP measurement set of the UE currently, the base station moves the measured cell into the CoMP measurement set of the UE. Of course, the UE may also calculate the measured cells which satisfy the condition of joining and/or leaving the CoMP measurement set of the UE, and then send the measurement result of the measured cells which satisfy the condition of joining or leaving the CoMP measurement set (such as the RSRP and/or RSRQ and/or the measurement event indication information) to the base station, then the base station further judges if the measured cells reported by the UE satisfy the condition of joining the CoMP measurement set of the UE, and updates the CoMP measurement set of the UE.

Furthermore, the base station may use the measurement report to perform other operations, for example, the base station may perform a mobility management for the UE according to the measurement report.

Step 704: sending, by the base station, the updated CoMP measurement set to the user equipment.

After completing the update of the CoMP measurement set of the UE, the base station sends the updated CoMP measurement set to the UE.

As can be seen, in embodiments of the present disclosure, by carrying the configuration identities of the measured cells belonging to the measured access point in the measurement configuration message, the UE can distinguish different measured cells according to the configuration identities in the measurement configuration message, bind the measurement result obtained by performing the measurement for the measured cell with the configuration identity of the measured cell, and then send the bound measurement result and configuration identity to the base station, so that the base station can distinguish the measurement result of different measured cells according to the configuration identities, thus, the CoMP measurement set of the UE can be updated effectively.

Figure 8:
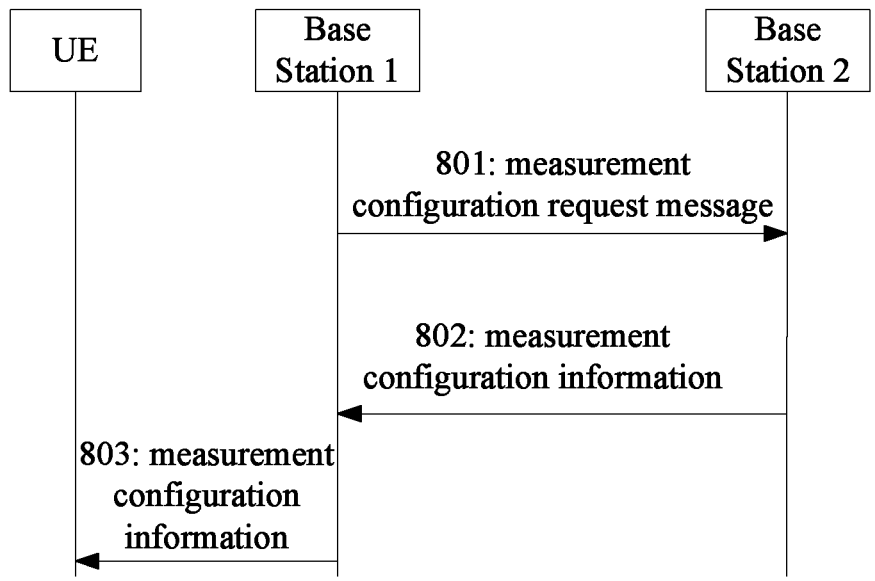
FIG. 8 is a schematic flowchart of a cell resource sharing method according to an embodiment of the present disclosure.

The following describes, taking a specific embodiment as an example, a cell resource sharing method according to embodiments of the present disclosure. Assuming there are base station 1 and base station 2 in a network, referring to FIG. 8, the cell resource sharing method according to an embodiment of the present disclosure includes:

Step 801: the base station 1 sends a measurement configuration request message to the base station 2.

In practical applications, the base station may send a measurement configuration request message to other base station(s) which is(are) connected with the base station via an interface, to instruct the other base station(s) to feed back the respective measurement configuration information of the cell(s) in the coverage of each other base station, where the measurement configuration information may include, for example, at least one of: CSI-RS configuration information, logical antenna port information, location information of the cell, and the label number of the AP to which the cell belongs. The CSI-RS configuration information may be the exclusive CSI-RS configuration information of a specific UE or may be the exclusive CSI-RS configuration information of a specific cell, which will not be limited herein.

In this embodiment, the base station 1 sends a measurement configuration request message to the base station 2, in practical applications, the base station 1 may send a measurement configuration request message to the base station 2 through the interface X2 or the interface S1.

Step 802: The base station 2 sends the measurement configuration information back to the base station 1.

When the base station 2 receives the measurement configuration request message sent by the base station 1, the base station 2 sends the measurement configuration information of the cell(s) in the local coverage to the other base station1 in response to the measurement configuration request message.

In practical applications, the base station 2 may send the measurement configuration information of the cell(s) in the local coverage to the other base station1 through the interface X2 or the interface S1.

The above measurement configuration request message and/or measurement configuration message may be a new and independent message, or may be incorporated into an X2 message or an S1 message in the prior art, for example, "resource status request/response", "X2 setup request/response", "eNB configuration update/update acknowledge" or "handover request/handover request acknowledge" or "load information", etc, which will not be limited herein.

It should be noted that, in this embodiment of the present disclosure, after the base station receives the measurement configuration request message sent by the other base station(s), the base station sends the measurement configuration information of the cell(s) in the local coverage back to the other base station(s); while in practical applications, the base station may also send the measurement configuration information of the cell(s) in the local coverage to the other base station(s) initiatively, which will not be limited herein.

Step 803: The base station 1 issues the obtained measurement configuration information to the UE.

After obtaining the measurement configuration information from the base station 2, the base station 1 may issue the measurement configuration information to the UE(s) in the local coverage of the base station 1, so that the UE(s) may perform measurement or other operations for the cells belonging to the base station 2.

As can be seen, in embodiments of the present disclosure, the base station issues the measurement configuration information of the cell(s) in the local coverage to other base station(s), which is(are) connected to the base station via an interface, in the network, so that every base station in the network may obtain and know the measurement configuration information of the cell(s) in the coverage of the other base station(s), and may issue the measurement configuration information of the cell(s) in the coverage of the other base station(s) to the UE(s), so that the UE(s) may perform the measurement or other operations for the cells belonging to other base stations.

Figure 9:
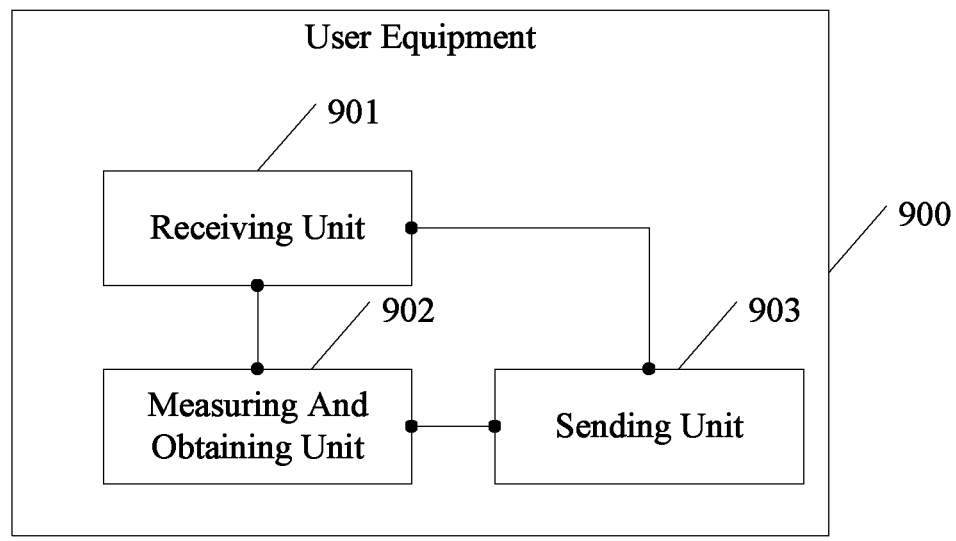
FIG. 9 is a schematic structural diagram of a user equipment according to an embodiment of the present disclosure.

The following describes a user equipment provided by the embodiments of the present disclosure, referring to FIG. 9, the user equipment 900 according to embodiments of the present disclosure includes:

A receiving unit 901, configured to receive a measurement configuration message sent by a base station.

The measurement configuration message includes at least one physical cell identity, and CSI-RS configuration information of each measured cell which is indicated by each physical cell identity; optionally, the measurement configuration message further includes a configuration identity which is in one to one correspondence with the measured cell, and optionally includes a measurement index number. The configuration identity may be the antenna port information of an AP to which the measured cell belongs, and/or the configuration index number of the CSI-RS configuration information of the measured cell. The antenna port information includes but not limited to an antenna port number and/or an amount of antenna ports. Of course, since each cell may correspond to different configuration information, in order to facilitate the management of different cells of the base station, cell numbers are optionally used to identify different cells, and a mapping relationship between the cell numbers and the CSI-RS configuration information of the cells may be established, thus the above configuration identity may also be the cell number of the measured cell, which will not be limited herein.

It should be noted that, in practical applications, the cells of multiple APs, which are in different geography positions, are configured with different antenna port information, and correspond to different CSI-RS configuration. The CSI-RS configuration information is used to define CSI-RS configuration, and mainly includes antenna port information, resource configuration information, sub-frame configuration information and so on of CSI-RS. Different CSI-RS configuration information corresponds to different configuration index number, so that the base station can manage the CSI-RS configuration information of cells of multiple APs. These CSI-RS configuration may be distinguished in the time field, the frequency field, the code field and/or the space, for example, the sub-frame positions and/or the sending period of sending CSI-RS are different (with sub-frame offset) among CSI-RS configuration corresponding to different cells.

It is understandable that, if one AP includes multiple antennas, that is to say, one AP corresponds to multiple cells, then the cells of different antennas of this AP correspond to different CSI-RS configuration, and the plural antennas of this AP correspond to different antenna port information.

The AP may be a base station which includes entirely a resource management module, a baseband processing module and radio frequency unit, or may be an RRH, an RRU, or an antenna, and may also be a relay, which will not be limited herein.

The measurement configuration message may be a RRC signaling, or may be a part of the RRC reconfiguration message, or a MAC signaling, which will not be limited herein.

A measuring and obtaining unit 902, configured to measure the CSI-RS corresponding to the measured cell according to the CSI-RS configuration information in the measurement configuration message received by the receiving unit 901, and obtaining the measurement result of the measuring. The measuring and obtaining unit 902 may distinguish resources of different measured cells, which are indicated by the same physical cell identity, according to the difference of CSI-RS configuration information and/or configuration identity (such as antenna port information or configuration index number of CSI configuration information) of the measured cells indicated by the same physical cell identity in the measurement configuration message; and may use the CSI-RS configuration information of different measured cells to measure the CSI-RS of the corresponding measured cells, and obtain the measure results, such as the CSI-RSRP and/or CSI-RSRQ, of the measured cells. For example, in practical applications, the measuring and obtaining unit 902 may obtain an SINR of the received signal of the measured cell by measuring the CSI-RS of the measured cell, and then obtain the CSI-RSRP and/or CSI-RSRQ of the measured cell through the SINR calculation.

In practical applications, the measuring and obtaining unit 902 may periodically measure and obtain the measurement result of the measured cell. If the measurement configuration message received by the receiving unit 901 includes measurement indication information, such as CSI-RSRP measurement indication information and/or CSI-RSRQ measurement indication information, the measuring and obtaining unit 902 may obtain the measured value(s) required by the base station according to the measurement indication information. For example, if the measurement request message includes the CSI-RSRP measurement indication information, the measuring and obtaining unit 902 obtains the CSI-RSRP of the measured cell; if the measurement request message includes the CSI-RSRQ measurement indication information, the measuring and obtaining unit 902 obtains the CSI-RSRQ of the measured cell; if the measure request message includes the CSI-RSRP measurement indication information and the CSI-RSRQ measurement indication information, the measuring and obtaining unit 902 obtains the CSI-RSRP and CSI-RSRQ of the measured cell. Certainly, the measuring and obtaining unit 902 may also obtain the CSI-RSRP and/or CSI-RSRQ of the measured cell by default according to a predetermined setting when the receiving unit 901 receives the measurement configuration message, which will not be limited herein.

In practical applications, the measuring and obtaining unit 902 may also measure and obtain the measurement result of the measured cell base on event, and the measuring and obtaining unit 902 may calculate the measured cells, which satisfy the condition of joining and/or leaving the CoMP measurement set of the UE by using the CSI-RSRP and/or CSI-RSRQ of each measured cell obtained by measuring.

A sending unit 903, configured to send the measurement result of the measured cell obtained by the measuring and obtaining unit 902 and the measurement object information indicating the measured cell, to the base station via a measurement report.

In practical applications, the sending unit 903 may report the measurement reports to the base station periodically, and correspondingly, the measurement result may include measurement results such as CSI-RSRP and/or CSI-RSRQ; the sending unit 903 may also report the measurement reports to the base station based on event, and correspondingly, the measurement result may include measurement results such as the CSI-RSRP and/or CSI-RSRQ, and/or measurement event indication information, where the measurement event indication information may be used to indicate that the measured cell is a cell which satisfies the condition of joining a CoMP measurement set, or a cell which satisfies the condition of leaving a CoMP measurement set. The measurement object information described above may include at least one of the CSI-RS configuration information, antenna port information of the access point to which the measured cell belongs, and the cell number of the measured cell, and the measurement index number in the measurement configuration message.

In application scenarios, the user equipment 900 may further include:

A cell distinguishing unit, configured to distinguish the CSI-RS configuration information of different measured cells which are indicated by the same physical cell identity by using the CSI-RS configuration information and/or the configuration identities of the measured cells in the measurement configuration message, when there are same physical cell identities in the received measurement configuration message.

It should be noted that, the user equipment 900 in this embodiment may be the user equipment in any of the foregoing method embodiments, and may configured to implement all the technical solutions of the foregoing method embodiments of the present disclosure, the function of each functional module may be specifically implemented according to the method in the foregoing method embodiments, and the specific implementing process may refer to the related description of the foregoing embodiments, which will not be repeated herein.

As can be seen, in embodiments of the present disclosure, by carrying at least one physical cell identity and CSI-RS configuration information of a measured cell indicated by the physical cell identity in a measurement configuration message, the UE may measure the CSI-RS of the measured cell and obtain the measurement result, and the UE may send the measurement result of the measured cell and the measurement object information, which is used to indicate the measured cell, to the base station via the measurement report. On one hand, the user equipment can distinguish the resources of different measured cells which are indicated by the same physical cell identity according to the difference of the CSI-RS configuration information and/or the configuration identity of the measured cells which are indicated by the same physical cell identity in the measurement configuration message. On the other hand, the base station can distinguish the measurement results of different measured cells according to the measurement object information, so as to update effectively the CoMP measurement set of the user equipment. Furthermore, in the CoMP system, when a cell is sending CSI-RS resource position, other cell(s) will not use the time-frequency domain resources being occupied by the cell for sending CSI-RS resource position to send data, so that the interference between the data can be avoided, thus, the measurement result obtained by measuring the CSI-RS, is more accurate than the measurement result obtained by measuring the CRS.

Figure 10:
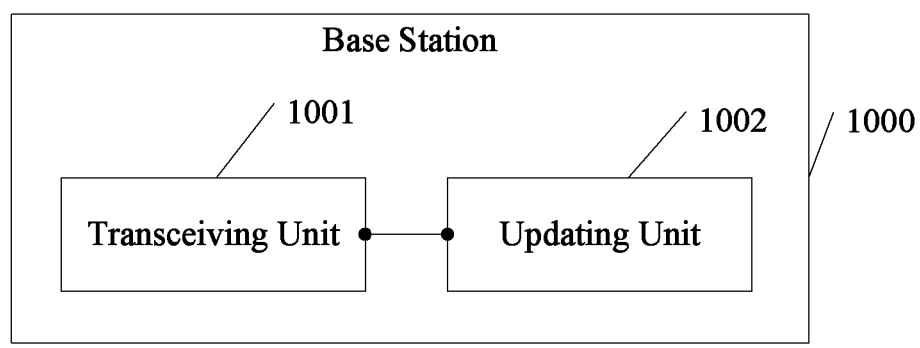
FIG. 10 is a schematic structural diagram of a base station according to an embodiment of the present disclosure.

The following describes a base station according to embodiments of the present disclosure, referring to FIG. 10, the user equipment 1000 according to embodiments of the present disclosure includes:

A transceiving unit 1001, configured to send a measurement configuration message to a user equipment, and to receive a measurement report sent by the user equipment.

The measurement configuration message carries at least one physical cell identity and the CSI-RS configuration information of each measured cell indicated by each physical cell identity; optionally, the measurement configuration message further includes the configuration identity which is in one to one correspondence with the measured cell, and optionally, a measurement index number. The configuration identity may be at least one of: antenna port information of an AP to which the measured cell belongs, the configuration index number of the CSI-RS configuration information of the measured cell, and the cell number of the measured cell. The antenna port information includes but not limited to antenna port number and/or the amount of antenna ports. Of course, since each cell may correspond to different configuration information, in order to facilitate the management of different cells for the base station, cell numbers are optionally used to identify different cells, and a mapping relationship between the cell numbers and the CSI-RS configuration information of the cells may be established, thus the above configuration identity may also be the cell number of the measured cell, which will not be limited herein.

It should be noted that, in actual application, the cells of multiple APs, which are in different geography positions, are configured with different antenna port information, and correspond to different CSI-RS configuration. The CSI-RS configuration information is used to define CSI-RS configuration, and mainly includes antenna port information, resource configuration information, sub-frame configuration information and so on of CSI-RS. Different CSI-RS configuration information corresponds to different configuration index number, so that the base station can manage the CSI-RS configuration information of cells of multiple APs. These CSI-RS configuration may be distinguished in the time field, the frequency field, the code field and/or the space, for example, the sub-frame positions and/or the sending period of sending CSI-RS are different (with sub-frame offset) among CSI-RS configuration corresponding to different cells.

It is understandable that, if one AP includes multiple antennas, that is to say, one AP corresponds to multiple cells, then the cells of different antennas of this AP correspond to different CSI-RS configuration, and the plural antennas of this AP correspond to different antenna port information.

The base station 1000 may also carry the measurement indication information in the measurement configuration message, such as CSI-RSRP measurement indication information and/or CSI-RSRQ measurement indication information, so as to instruct the user equipment to measure and obtain the CSI-RSRP and/or CSI-RSRQ of the measured cell.

In practical applications, the transceiving unit 1001 may also send a measurement configuration request message to other base station(s) which is(are) connected with the base station 1000 via an interface, to instruct the other base station(s) to feed back the respective measurement configuration information of the cell(s) in the coverage of each other base station. The measurement configuration information includes, but not limited to, the CSI-RS configuration information (may be the exclusive CSI-RS configuration information of a specific UE or a specific cell), and/or logical antenna port information, and may also include the label number of the AP and so on. For example, the transceiving unit 1001 may send the measurement configuration request message to the other base station(s), which is(are) connected with the base station 1000 via an interface, through the interface X2 or the interface S1; the transceiving unit 1001 may also send the measurement configuration information of the cell(s) in the local coverage back to the other base station(s) after receiving the measurement configuration request message from the other base station(s), for example, the transceiving unit 1001 may send the measurement configuration information of the cell(s) in the local coverage back to the other base station(s) through the interface X2 or the interface S1. Of course, the base station may initiatively send the measurement configuration information of the cell(s) in the local coverage back to the other base station(s) through the transceiving unit 1001, for example, may send the CSI-RS configuration information of the cell(s) in the local coverage, and the configuration identity of the cell(s)

in the local coverage back to the other base station(s) through the interface X2 or the interface S1, which will not be limited herein.

The above measurement configuration request message and/or measurement configuration message may be a new and independent message, or may be incorporated into an X2 message or an S1 message in the prior art, for example, "resource status request/response", "X2 setup request/response", "eNB configuration update/update acknowledge" or "handover request/handover request acknowledge" or "load information", etc, which will not be limited herein.

The AP may be a base station which includes entirely an resource management module, a baseband processing module and radio frequency unit, or may be an RRH, an RRU, or an antenna, and the AP may also be a relay, which will not be limited herein.

The above measurement report includes measurement result(s) and measurement object information. The measurement object information described above may include at least one of the CSI-RS configuration information, antenna port information of the access point to which the measured cell belongs, a configuration identity of the measured cell, and the measurement index number in the measurement configuration message. The measurement result(s) may include CSI-RSRP and/or CSI-RSRQ of the measured cell, or, may also include the measurement event indication information.

In an application scenario, the transceiving unit 1001 may also configured to receive the measurement configuration request message and/or the measurement configuration information sent by other base station(s) in the network.

An updating unit 1002, configured to update the CoMP measurement set of the UE according to the measurement report received by the transceiving unit 1001.

The transceiving unit 1001 is further configured to send the CoMP measurement set updated by the updating unit 1002 to the user equipment.

In an application scenario, the base station 1000 may further include a managing unit, where the managing unit may be configured to perform a mobility management for the UE according to the measurement report received by the transceiving unit 1001.

It should be noted that, the base station 1000 in this embodiment may be the base station in any of the foregoing method embodiments, and may be configured to implement all the technical solutions of the foregoing method embodiments of the present disclosure, the function of each functional module may be specifically implemented according to the method in the foregoing method embodiments, and the specific implementing process may refer to the related description of the foregoing embodiments, which will not be repeated herein.

As can be seen, in embodiments of the present disclosure, by carrying at least one physical cell identity and CSI-RS configuration information of a measured cell indicated by the physical cell identity in a measurement configuration message, the UE may measure the CSI-RS of the measured cell and obtain the measurement result, and the UE may send the measurement result of the measured cell and the measurement object information, which is used to indicate the measured cell, to the base station via the measurement report. On one hand, the UE can distinguish the resources of different measured cells which are indicated by the same physical cell identity according to the difference of the CSI-RS configuration information and/or the configuration identity of the measured cells which are indicated by the same physical cell identity in the measurement configuration message. On the other hand, the base station can distinguish the measurement results of different measured cells according to the measurement object information, so as to update effectively the CoMP measurement set of the UE. Furthermore, in the CoMP system, when a cell is sending CSI-RS resource position, other cell(s) will not use the time-frequency domain resources being occupied by the cell for sending CSI-RS resource position to send data, so that the interference between the data can be avoided, thus, the measurement result obtained by measuring the CSI-RS, is more accurate than the measurement result obtained by measuring the CRS.

The following describes another user equipment according to embodiments of the present disclosure. The another user equipment according to embodiments of the present disclosure includes:

A receiving unit, configured to receive a measurement configuration message sent by a base station.

The measurement configuration message includes at least one physical cell identity, and the configuration identity of the measured cell indicated by each physical cell identity. The configuration identity may be the antenna port information of the AP to which the cell belongs, and the antenna port information includes antenna port number and/or an amount of antenna ports.

It should be noted that, in practical applications, the cells of multiple APs, which are in different geography positions, may be configured with a same physical cell identity, and different antenna port information, such as antenna port number and/or quantity of antenna ports.

It is understandable that, if one AP includes multiple antennas, that is to say, one AP corresponds to multiple cells, then the cells of different antennas of this AP correspond to different antenna port information, such as antenna port number and/or quantity of antenna ports.

The AP may be a base station which includes entirely an resource management module, a baseband processing module and radio frequency unit, or may be an RRH, an RRU, or an antenna, and may also be a relay, which will not be limited herein.

A measuring and obtaining unit, configured to distinguish different CRS configuration information of different measured cells according to the configuration identity, such as the antenna port information, in the measurement configuration message, and use the CRS configuration information to measure the CRS of the measured cell, and obtain the measurement result of the measured cell, such as the RSRP and/or RSRQ of the measured cell.

In a practical application, the measuring and obtaining unit may measure and obtain the RSRP and/or RSRQ of the measured cell periodically. If the measurement request message received by the UE includes the measurement indication information, such as RSRP measurement indication information and/or RSRQ measurement indication information, the measuring and obtaining unit may obtain the measured value(s), which is required by base station, according to the measurement indication information. For example, if the measurement request message includes the RSRP measurement indication information, the measuring and obtaining unit obtains the RSRP of the measured cell; if the measurement request message includes the RSRQ measurement indication information, the measuring and obtaining unit obtains the RSRQ of the measured cell; if the measure request message includes the RSRP measurement indication information and the RSRQ measurement indication information, the measuring and obtaining unit obtains the RSRP and RSRQ of the measured cell. Certainly, the measuring and obtaining unit may also obtain the RSRP and/or RSRQ of the measured cell by default according to a predetermined setting when the measurement configuration message is received by the receiving unit, which will not be limited herein.

In practical applications, the measuring and obtaining unit may also measure and obtain the measurement results of the measured cells based on event, and the measuring and obtaining unit may calculate the measured cells, which satisfy the condition of joining or leaving the CoMP measurement set of the UE, by using the RSRP and/or RSRQ of each measured cell obtained by measuring.

A sending unit, configured to send the measurement result of the measured cell obtained by the measuring and obtaining unit and the configuration identity of the measured cell to the base station via a measurement report.

It should be noted that, the user equipment in this embodiment may be the user equipment in any of the foregoing method embodiments, and may configured to implement all the technical solutions of the foregoing method embodiments of the present disclosure, the function of each functional module may be specifically implemented according to the method in the foregoing method embodiments, and the specific implementing process may refer to the related description of the foregoing embodiments, which will not be repeated herein.

As can be seen, in embodiments of the present disclosure, by carrying the configuration identities of the measured cells belonging to the measured access point in the measurement configuration message, the UE can distinguish different measured cells according to the configuration identities in the measurement configuration message, bind the measurement result obtained by performing the CRS measurement for the measured cell with the configuration identity of the measured cell, and then send the bound measurement result and configuration identity to the base station, so that the base station can distinguish the measurement result of different measured cells according to the configuration identities, thus the CoMP measurement set of the UE can be updated effectively.

The following describes another base station according to embodiments of the present disclosure. The another base station according embodiments of the present disclosure includes:

A transceiving unit, configured to send a measurement configuration message to a user equipment and receive a measurement report sent by the user equipment.

The measurement configuration message includes at least one physical cell identity, and the configuration identity of the measured cell indicated by each physical cell identity. The configuration identity may be the antenna port information of the AP to which the cell belongs, and the antenna port information includes antenna port number and/or the amount of antenna ports. The base station may also carry the measurement indication information, such as the RSRP measurement indication information and/or RSRQ measurement indication information, in the measurement configuration message, so as to instruct the UE to obtain the RSRP and/or RSRQ of the measured cell.

In practical applications, the transceiving unit may also send a measurement configuration request message to other base station(s) which is(are) connected with the base station via an interface, to instruct the other base station(s) to feed back the respective measurement configuration information such as the CRS configuration information of the cell(s) in the coverage of each other base station and the configuration identity of the cell, for example, the transceiving unit may send the measurement configuration request message to the other base station(s) through the interface X2 or the interface S1; and the base station may also send the measurement configuration information of the cell(s) in the local coverage through the transceiving unit, such as the CRS configuration information and the configuration identity of the cell, back to the other base station(s) after receiving the measurement configuration request message from the other base station(s). Of course, the base station may also send the measurement configuration information of the cell(s) in the local coverage back to the other base station(s) after sending a measurement configuration request message to other base station(s) through the transceiving unit initiatively. In actual applications, the transceiving unit may send the measurement configuration information of the cell(s) in the local coverage to the other base station(s) through the interface X2 or the interface S1.

It should be noted that, in practical applications, the cells of multiple APs, which are in different geography positions, may be configured with a same physical cell identity, and with different antenna port information, such as antenna port number and/or the amount of antenna ports.

It is understandable that, if one AP includes multiple antennas, that is to say, one AP corresponds to multiple cells, then the cells belonging to different antennas of the AP correspond to different antenna port information.

The measurement report includes the measurement results (such as the RSRP and/or RSRQ of the measured cell) and the configuration identities of the measured cells, and the base station may distinguish the measurement results of different measured cells according to the configuration identities of the measured cells.

In an application scenario, the transceiving unit may further configured to receive the measurement configuration request message and/or the measurement configuration information sent by other base station(s).

An updating unit, configured to update the CoMP measurement set of the user equipment according to the measurement report received by the transceiving unit.

The above transceiving unit is further configured to send the CoMP measurement set updated by the updating unit to the user equipment.

In an application scenario, the base station may further include a managing unit, where the managing unit may be configured to perform a mobility management to the UE according to the measurement report received by the transceiving unit.

It should be noted that, the base station in this embodiment may be the base station in any of the foregoing method embodiments, and may configured to implement all the technical solutions of the foregoing method embodiments of the present disclosure, the function of each functional module may be specifically implemented according to the method in the foregoing method embodiments, and the specific implementing process may refer to the related description of the foregoing embodiments, which will not be repeated herein.

As can be seen, in embodiments of the present disclosure, by carrying the configuration identities of the measured cells belonging to the measured access point in the measurement configuration message, the UE can distinguish different measured cells according to the configuration identities in the measurement configuration message, bind the measurement result obtained by performing the measurement for the measured cell with the configuration identity of the measured cell, and then send the bound measurement result and configuration identity to the base station, so that the base station can distinguish the measurement result of different measured cells according to the configuration identities, thus, the CoMP measurement set of the UE can be updated effectively.

The following describes a base station according to embodiments of the present disclosure. The base station according to embodiments of the present disclosure includes:

A transceiving unit and an issuing unit.

Where, the transceiving unit is configured to send a measurement configuration request message to other base station(s) which is(are) connected with the base station via an interface, to instruct the other base station(s) to feed back the respective measurement configuration information of the cell(s) in the coverage of each other base station; and to receive the above measurement configuration information from the other base station(s).

The above measurement configuration information includes at least one of: CSI-RS configuration information (may be the exclusive CSI-RS configuration information of a specific UE or a specific cell), the logical antenna port information, location information of the cell, and the label number of the AP to which the cell belongs.

In an application scenario, the transceiving unit may further send the measurement configuration information of the cell(s) in the local coverage to the other base station(s) initiatively; or, after the base station receives the above measurement configuration request message from the other base station(s), the transceiving unit may send the measurement configuration information of the cell(s) in the local coverage to the other base station(s).

In an application scenario, the transceiving unit may further configured to receive the above measurement configuration request message from the other base station(s).

The issuing unit is configured to issue the measurement configuration information received by the transceiving unit from the other base station(s) to the UE(s); so that the UE(s) may perform measurement or other operation for the cells belonging to the other base station(s) in the network.

As can be seen, in embodiments of the present disclosure, the base station issues the measurement configuration information of the cell(s) of the AP(s) in the local coverage to other base station(s) in the network, so that every base station in the network may obtain and know the measurement configuration information of the cell(s) in the coverage of the other base station(s), and may issue the measurement configuration information of the cell(s) in the coverage of the other base station(s) to the UE(s), so that the UE(s) may perform the measurement or other operations for the cells belonging to other base stations.

Persons of ordinary skill in the art may clearly understand that, for the convenience and brevity of description, the specific implementing process of the systems, apparatuses, and units described above, may refer to the corresponding process of the foregoing method embodiments, which will not be repeated herein.

It should be understandable that, the systems, apparatuses and methods, which are disclosed in several embodiments of the present disclosure, can be achieved in other ways. For example, the preceding apparatus embodiments are merely illustrative, for instance, the division of units is just one kind of division based on logical function, while in the actual applications, other division manners may be applicable, for example, multiple units or components may be combined or may be integrated into another system, or some of the features may be ignored, or may not be implemented. In addition, the shown or discussed mutual coupling or direct coupling or communication connection may be via indirectly coupling or communication connection between some interfaces, devices or units, which may be electrical, mechanical, or in other forms.

The units described as separated components, may be or may not be separated physically, the components shown as units may be or may not be physical units, that is, may located at one position, or may be distributed on multiple network units. Some or all of the units may be selected according to the actual requirements to achieve the purpose of the solution of embodiments of the present disclosure.

In addition, various function units in embodiments of the present disclosure may be integrated in one processing module, or be physically independent; or two or more function units may be integrated into one module. The preceding integrated module may be not only implemented in the form of hardware, but also implemented in the form of a software function module.

If the integrated module is implemented in the form of a software functional module, and functions as an independent product for sale or use, it may also be stored in a computer readable storage medium. Based on this understanding, all or part of the technical solution of the present disclosure in essence or the part contributing to the prior art of the technical solution, may be embodied in the form of software products, the software products of computer may be stored in a storage medium, including some instructions which may cause a computer device (which may be a computer, a server, or a network equipment) to execute all or part of the steps in the method of embodiments of the present disclosure. The storage medium may be various medium which can be used to store program codes, including: a USB flash disk, a mobile hard disk, a Read Only Memory (ROM) or a Random Access Memory (RAM), a magnetic disk, or an optical disk or the like.

Although the cell measurement method, the cell resource sharing method, and the related devices provided by the present disclosure are described in detail with reference to the foregoing embodiments, persons of ordinary skill in the art should understand that they may still make modifications to the specific implementation methods and the application scope without departing from the spirit and scope of the technical solutions of embodiments of the present disclosure. Therefore, the contents of the description should not be intended to limit the present disclosure.

What is claimed is:

1. A cell measurement method, comprising:
    sending, by a base station, a measurement configuration message to a user equipment, the measurement configuration message comprises a physical cell identity, channel state information-reference signal (CSI-RS) configuration information corresponding to each of a plurality of cells indicated by the physical cell identity, a layer-3 filtering parameter, and a configuration index number of the CSI-RS configuration information, wherein the CSI-RS configuration information corresponding to each of the plurality of cells indicated by the physical cell identity is different;
    receiving, by the base station, a measurement report comprising a channel state information-reference signal received power (CSI-RSRP) obtained using the layer-3 filtering parameter on a CSI-RS corresponding to a first cell of the plurality of cells, wherein the measurement report further comprises the configuration index number of the CSI-RS configuration information corresponding to the first cell; and performing, by the base station, mobility management according to the CSI-RSRP.

2. The method according to claim 1, further comprising:
updating, by the base station, a coordinated multi-point transmission (CoMP) measurement set of the user equipment according to the measurement report; and
sending, by the base station, the updated CoMP measurement set to the user equipment.

3. The method according to claim 1, wherein the measurement configuration message further comprises measurement reporting mode indication information, wherein the measurement reporting mode indication information is used to indicate the user equipment to perform measurement reporting for the first cell periodically or based on event.

4. The method according to claim 1, wherein:
the measurement configuration message further comprises CSI-RSRP measurement indication information, wherein the CSI-RSRP measurement indication information is used to indicate the UE to obtain CSI-RSRP of the first cell.

5. The method according to claim 1, wherein:
the measurement configuration message is one of a radio resource control (RRC) signaling or a media access control (MAC) signaling.

6. A base station, comprising:
a computing hardware; and
a non-transitory computer-readable medium including computer-executable instructions that, when executed by the computing hardware, cause the base station to send a measurement configuration message to a user equipment, and the measurement configuration message comprises a physical cell identity, channel state information-reference signal (CSI-RS) configuration information corresponding to each of a plurality of cells indicated by the physical cell identity, and the CSI-RS configuration information corresponding to each of the plurality of cells indicated by the physical cell identity is different, a layer-3 filtering parameter, and a configuration index number of the CSI-RS configuration information, receive a measurement report comprising a channel state information-reference signal received power (CSI-RSRP) obtained using the layer-3 filtering parameter on a CSI-RS corresponding to a first cell of the plurality of cells, wherein the measurement report further comprises the configuration index number of the CSI-RS configuration information corresponding to the first cell and perform mobility management according to the CSI-RSRP.

7. The base station according to claim 6, wherein the non-transitory computer-readable medium further includes computer-executable instructions that, when executed by the computing hardware, cause the base station to carry out the method including:
updating a coordinated multi-point transmission (CoMP) measurement set of the user equipment according to the measurement report; and
sending the updated CoMP measurement set to the user equipment.

8. The base station according to claim 6, wherein the measurement configuration message further comprises measurement reporting mode indication information, wherein the measurement reporting mode indication information is used to indicate the user equipment to perform measurement reporting for the first cell periodically or based on event.

9. The base station according to claim 6, wherein:
the measurement configuration message further comprises CSI-RSRP measurement indication information, wherein the CSI-RSRP measurement indication information is used to indicate the UE to obtain CSI-RSRP of the first cell.

10. The base station according to claim 6, wherein:
the measurement configuration message is one of a radio resource control (RRC) signaling or a media access control (MAC) signaling.

* * * * *

UNITED STATES PATENT AND TRADEMARK OFFICE
CERTIFICATE OF CORRECTION

PATENT NO. : 10,560,327 B2
APPLICATION NO. : 16/140149
DATED : February 11, 2020
INVENTOR(S) : Li Chai It is certified that error appears in the above-identified patent and that said Letters Patent is hereby corrected as shown below:

On the Title Page

On Page 2, item (56) under "OTHER PUBLICATIONS", Column 2, Line 21, delete "getwork" and insert -- network --, therefor.

In the Specification

In Column 1, Line 9, delete "which a" and insert -- which is a --, therefor.

In Column 8, Line 48, delete "my perform" and insert -- may perform --, therefor.

In Column 10, Line 47, delete "condition of" and insert -- condition of joining --, therefor.

In Column 31, Line 43, delete "according" and insert -- according to --, therefor.

Signed and Sealed this
Thirty-first Day of January, 2023

Katherine Kelly Vidal
*Director of the United States Patent and Trademark Office*